US006658400B2

(12) United States Patent
Perell et al.

(10) Patent No.: US 6,658,400 B2
(45) Date of Patent: Dec. 2, 2003

(54) DATA CERTIFICATION AND VERIFICATION SYSTEM HAVING A MULTIPLE-USER-CONTROLLED DATA INTERFACE

(75) Inventors: William S. Perell, 730A Liggett Ave., San Francisco, CA (US) 94129-1116; Neil S. Hayden, Franklin Lakes, NJ (US); Walter D. Benvin, New York, NY (US)

(73) Assignee: William S. Perell, San Francisco, CA (US)

( * ) Notice: Subject to any disclaimer, the term of this patent is extended or adjusted under 35 U.S.C. 154(b) by 213 days.

(21) Appl. No.: 09/729,580

(22) Filed: Dec. 4, 2000

(65) Prior Publication Data

US 2001/0047347 A1 Nov. 29, 2001

Related U.S. Application Data

(60) Provisional application No. 60/169,040, filed on Dec. 4, 1999.

(51) Int. Cl.[7] .............................................. G06F 17/30
(52) U.S. Cl. .............................. 707/1; 707/3; 707/10; 705/8
(58) Field of Search .................. 707/1, 9, 10, 101, 707/102, 500, 104.1, 3, 4, 6, 2, 5; 705/1, 8, 9, 52, 14; 704/247, 1, 3, 50; 709/229; 713/164, 187, 201

(56) References Cited

U.S. PATENT DOCUMENTS

| | | | | |
|---|---|---|---|---|
| 5,263,158 A | * | 11/1993 | Janis .............................. | 707/1 |
| 5,696,898 A | * | 12/1997 | Baker et al. ................... | 707/9 |
| 5,826,258 A | * | 10/1998 | Gupta et al. ................... | 707/10 |
| 5,937,084 A | * | 8/1999 | Crabtree et al. ............. | 707/500 |
| 6,157,926 A | * | 12/2000 | Appleman et al. .......... | 707/102 |
| 6,236,996 B1 | * | 5/2001 | Bapat et al. ................. | 707/101 |
| 6,370,139 B2 | * | 4/2002 | Redmond ....................... | 707/9 |
| 6,385,620 B1 | * | 5/2002 | Kurzius et al. .......... | 707/104.1 |

* cited by examiner

Primary Examiner—Charles Rones
Assistant Examiner—Hassan Mahmoudi
(74) Attorney, Agent, or Firm—Paul Hentzel

(57) ABSTRACT

A method and apparatus is described for multiple-party data attribute management system and interface structure which permits different categories of users to contribute and control different types of source data, while adding informational value to data contributed by other users. The system provides a secure repository for verified and authenticated data, and provides a system of controlled access to the repository. The preferred embodiment of the invention comprises a data verification and certification system which in a principal embodiment is useful to create a data bank to match job seekers with potential employers based on verified resume data and employer specified search criteria. The interface structure The system of the invention preferably includes computer databases and interactive Internet based server systems.

7 Claims, 8 Drawing Sheets

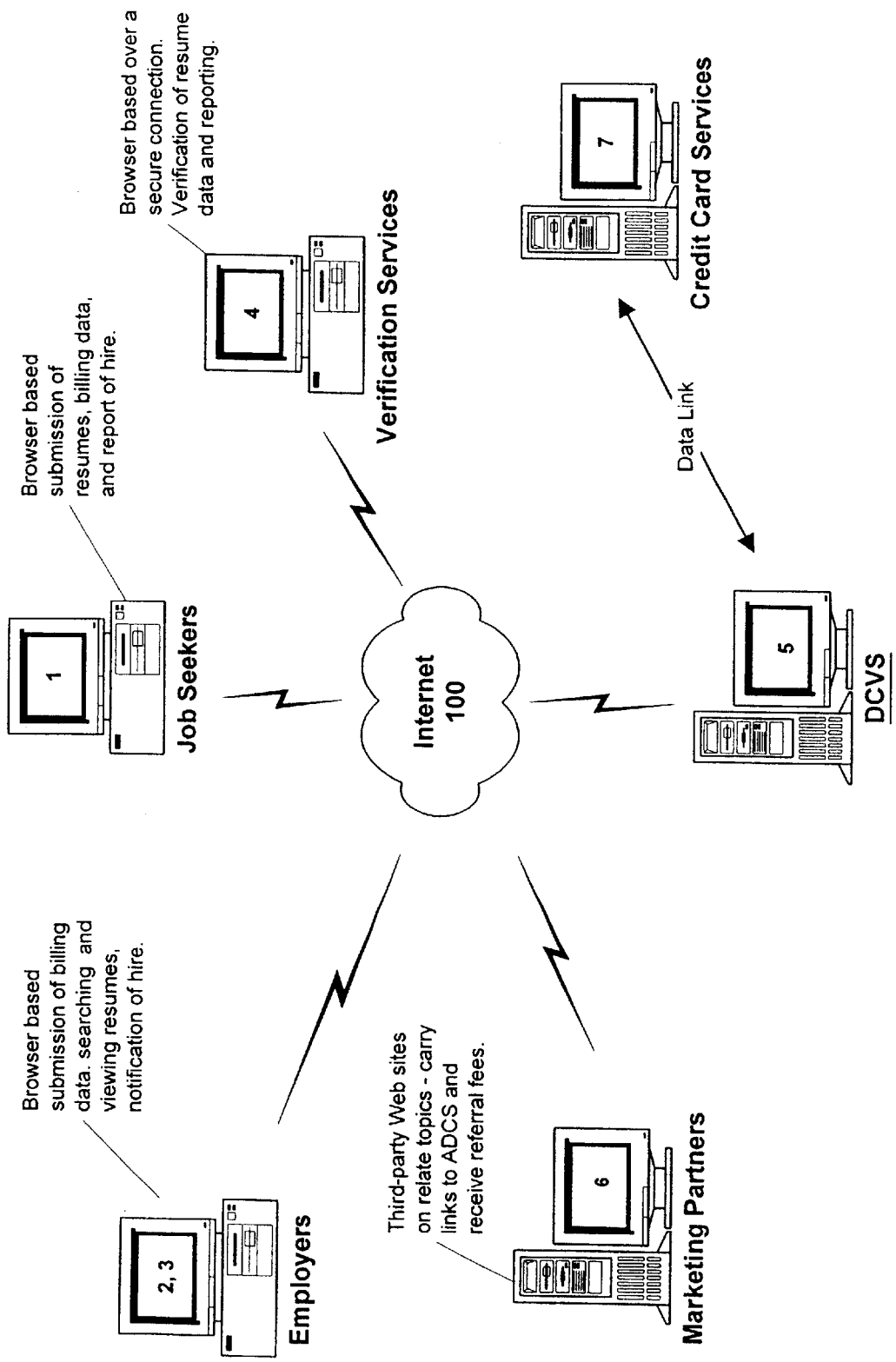
Figure 1 - DCVS Overview

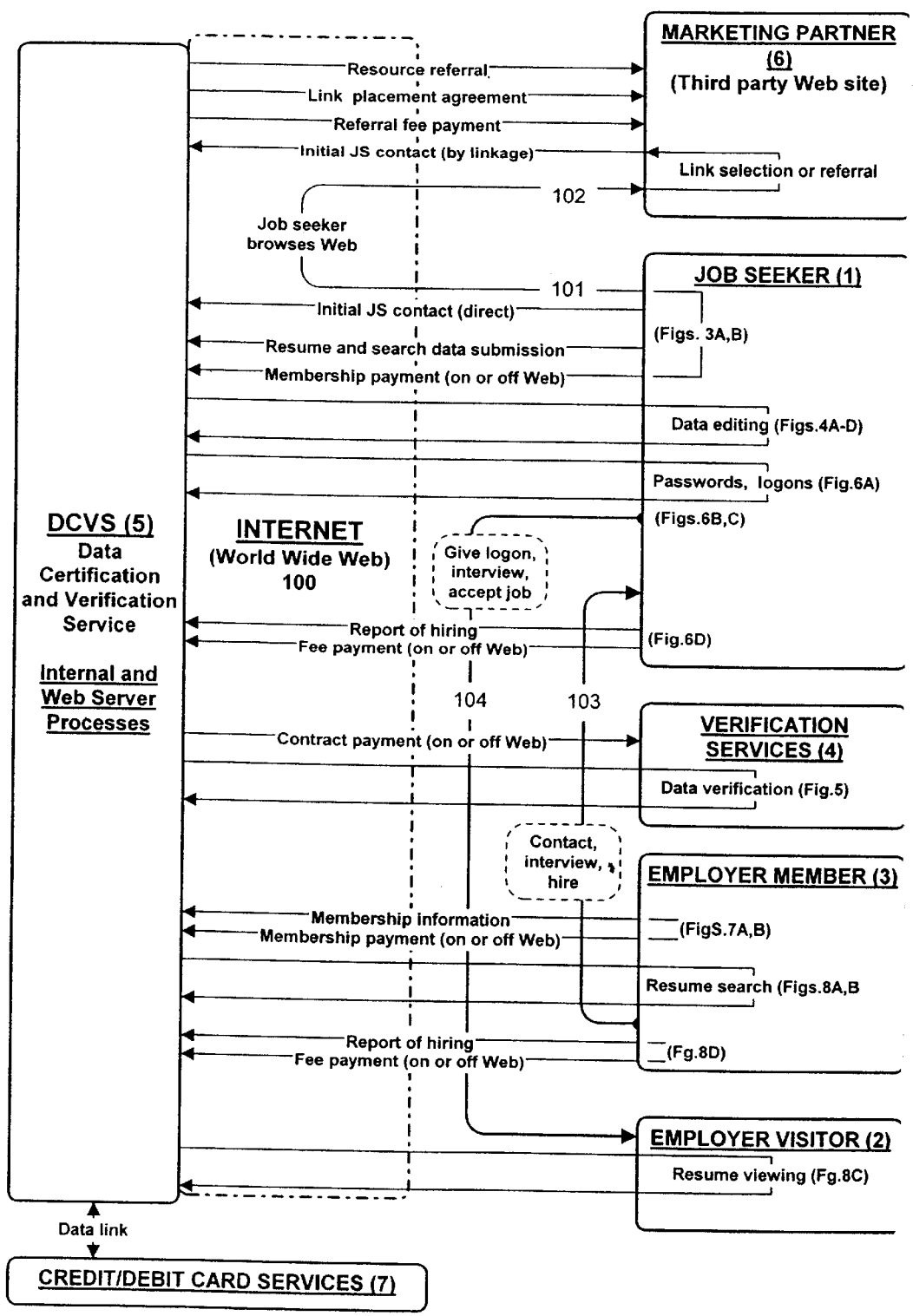
Figure 2 - DVCS Internet Interface Structure

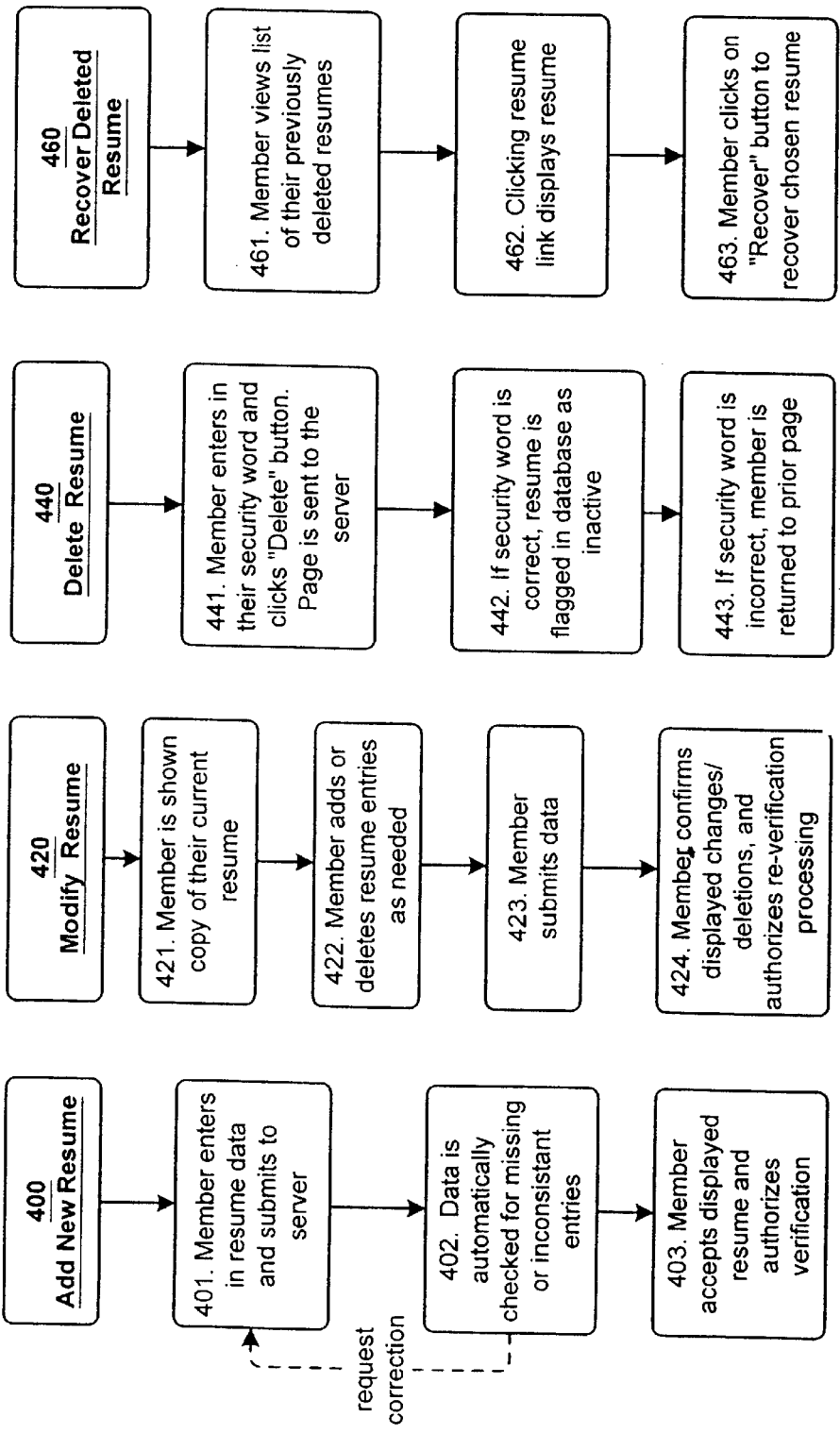

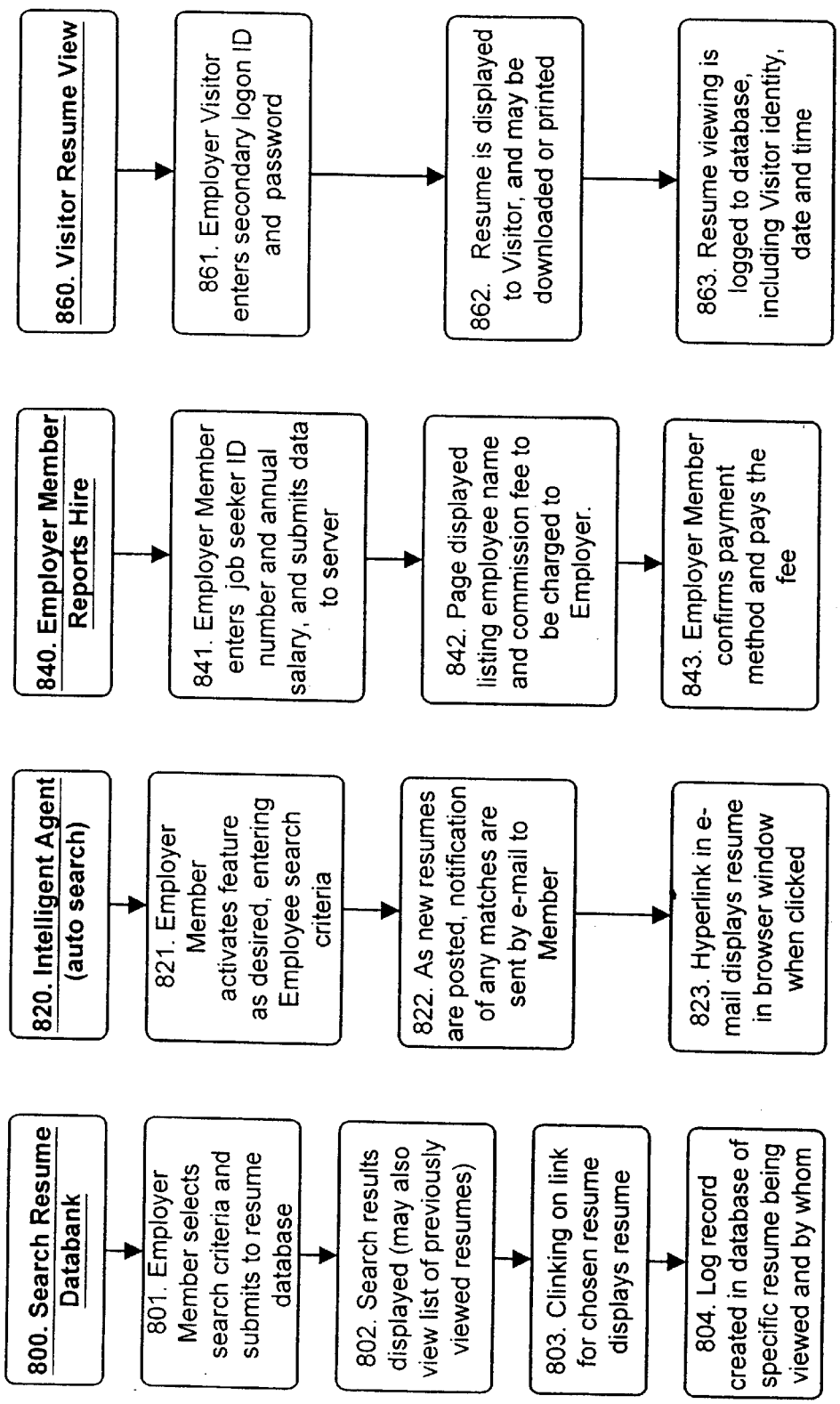

ND VERIFICATION
DATA CERTIFICATION AND VERIFICATION SYSTEM HAVING A MULTIPLE-USER-CONTROLLED DATA INTERFACE

This application claims the benefit of U.S. Provisional Application No. 60/169,040, filed Dec. 4, 1999.

TECHNICAL FIELD

The invention relates to computer database and interactive server systems, and more particularly to systems including multiple user Internet based interfaces. The interface structure of the invention permits different categories of users to contribute and control different types of source data, while adding informational value to data contributed by other users. The system provides a secure repository for verified and authenticated data, and provides a system of controlled access to the repository. The preferred embodiment of the invention comprises a data verification and certification system which in a principal embodiment is useful to create a data bank to match job seekers with potential employers based on verified resume data and employer specified search criteria

BACKGROUND

In the field of employee recruitment and staffing, there is a tremendous need in the industry to obtain, screen and verify data on job seekers, and to match qualifications with job requirements. Such data includes educational history, employment experience, and basic personal information. Traditionally, this has been done almost entirely by paper-based manual means, such as newspaper advertising, unverified resumes, telephone or mail contact by prospective employers to the apparent sources to verify resume data, and the like. The traditional job search and hiring process is extremely time-consuming and costly to all parties involved. In large companies, the employment applicant verification task is a major assignment and cost of the HR departments.

In addition, the information obtained through unverified job seeker's resumes is often of uncertain reliability. It has been estimated that nearly one-half of all resumes submitted in the hiring process have substantial errors or misrepresentations of fact, or outright fraud, which tends to distort the hiring decision making process. Newspapers frequently report of cases of false doctors, lawyers, brokers, teachers, executives, or those who have misrepresented or "puffed" their experience or education. The more sensitive the job, the more difficult and time consuming the verification process becomes.

While it is possible for an employer to verify resume data, this an expensive process and is inherently wasteful, in that the labor cost of verifying data is lost if the employee is not hired, and the verification work-product (verified resume data) is not available to other potential employers.

Computer and Internet methods are being used to reduce the costs and time consumed in the recruitment and hiring process. For example, many larger employers maintain job opportunity websites, and encourage resume submittal from job seekers by e-mail and electronic file transfer means, or scan in mailed resumes. Key-word based search software may be used to pre-screen resumes based on job qualification data as represented by the job seeker. However, these means merely speed the transfer of data which is no more reliable, and do not avoid the inherent wastefulness of duplicated effort. Indeed, the Internet tends to foster puffing bordering on misrepresentation or fraud because of the ease of communication, the relative anonymity, and the "if-it-is-printed-it-looks-true" phenomenon There are conventional services to assist job seekers and employers, such as employment agency job listings, and professional recruiters. However, job listings services simply make job opportunity information more available to job seekers, and do not produce more reliable resume data from employees. Professional recruiters and employment agencies can attempt to verify resume data to the extent that costs allow, but such "verified" data remains the proprietary work product of the agency or recruiter, and is not of value to either the job seeker or potential employers outside of the recruiter's activities. Furthermore, the agency or recruiter does not have access to data previously verified by others in prior employment searches regarding the job seeker. In essence, the agency or recruiter must "re-invent the wheel" with respect to each item of resume data verified, at high cost. This cost inevitably must be borne by either the job seeker or the hiring employer.

What is needed, and is not available in the hiring and recruitment field, is a system for efficiently obtaining and maintaining reliable resume data pertaining to job seekers, without duplication and repetition of verification effort, so that the verification data may be used by multiple potential employers. What is also needed is a means of accomplishing the foregoing efficiently, quickly, and with a high degree of automation to provide high availability and affordability to both job seekers and employers.

THE INVENTION

Summary, Including Objects and Advantages

The Data Certification and Verification Process and System (DCVP) of the invention is a system and method for accumulating, verifying, certifying and maintaining in a readily available database, resume data pertaining to job seekers, so that the data may be searched and used by potential employers at the election of the prospective employee. The verification and certification of resume data creates a "portable" value-added attribute of each certified item of resume, so that certified attribute of the data item can be shared among several different potential employers during the course of a job search. The certified attribute of the data may also be maintained through time as a person travels along a career ladder, with updating data items being certified as needed.

The DCVP of the invention is preferably primarily an Internet-based system and operation, residing on a provider's Internet server providing database storage, processing capability, access, and security. The DCVP also provides for interaction with other server-based applications such as E-mail services, credit/debit card processing, and accounting, reporting and statistical functions. The DCVP is preferably carried out by a dedicated service provider, known as a Data Certification and Verification Service (DCVS).

The preferred embodiment of the DCVP of the invention comprises a data base system providing for interactive access of multiple parties and categories of parties, in addition to the system administrator DCVS. In the preferred embodiment, the respective categories of parties with access may each have the same or differing scope of access, differing powers to create and edit records and differing powers to alter the access and powers of other parties. For each category, the scope of access and powers may be constrained by rules-based limitations governing the status of each party (membership agreement provisions and status). In particular, the primary source data (resume information relevant to job qualifications) may be contributed by Job Seekers, who create personal database records. Job Seekers also may establish search criteria for matching with corresponding criteria supplied by potential employers (Employer Members).

The DCVS, in turn, contributes value-added attributes to the personal database records (resume verification and certification status), either directly, or by action of third-party verification service contractors (VS). When third-party VS are employed, the DCVS assigns specific unverified resume data records to a particular VS. The VS, in turn, has access to assigned resume records, and has the power to contribute verification attributes (verification status) and/or comments regarding the same, such as degree of verifiability for each resume data item.

A Job Seeker may grant powers to specifically-selected potential employers (Employer Visitors) to allow read-only access to their particular certified resume record, and may disable or deny access, as desired. Other potential employers (Employer Members) have powers to search the database of all active (not-disabled) certified resume records according to matches of Job Seeker supplied criteria with member-supplied search criteria, and to view the resumes found. Alternatively, Employer Members have powers to search the database of all such non-disabled resumes, for example on a key-word, audio track, visual images, etc. basis based on resume content.

Both Job Seekers and Employer Members may be required to report successful hiring by means of the certified resume, pursuant to membership commission agreements.

Availability of access to the DCVS is preferably maximized by the action of referrals of Job Seekers and Employer Members by means of hyperlinks in third party websites (Marketing Partners). Such third-party referrals may be by commission agreement, in which case the Marketing Partner may attach an identifying code to the referral URL to allow the referrals from each such Marketing Partner to be tracked by the DCVS. The URL codes may also be tracked by the DCVS in relation to a particular Job Seeker or Employer Member record, for purposes of results-based commission calculations.

The DCVS preferably acts as a continuing certifying and secure custodial entity for the verified resume database records, in which any Job Seeker-initiated changes or additions are re-verified. This vital custodial security function provides assurance to potential employers that the value-added attribute of verification of resume data is not compromised.

In other words, the DCVS may in general provide a custodial "escrow" for data of many different kinds, useful in the presently preferred embodiment of the DCVP and in the alternative DCVP embodiments discussed below. The DCVP functionality includes providing security against tampering, contamination, or destruction of data (data "vault" protection). The DCVP may provide controlled data contribution access, controlled data attribute modification (such as verification status, approval status, and the like). The DCVP may include timed data access controls (time-sensitive data exchanges or publications). The DCVP may provide for data management based on mutually agreed instructions from multiple independent parties in business transactions (for example, source code preservation and protection, "due diligence" data in corporate merger negotiations, and the like). This flexible "escrow" functionality of the DCVP permits interacting parties to maximize added data value and to preserve the value of the data.

In the preferred DCVP embodiment, the DCVS therefor serves as a common and continuing resource (within the record enablement powers reserved to the Job Seeker) for potential employers to obtain reliable information on which to base hiring decisions.

Likewise, Job Seekers are assured that the personal resume maintained in the database will remain available, as needed during their careers, with the value-added verification and security attributes uncompromised. The additional re-verification costs of maintaining the resume in certified status will thus be limited to new or update items only.

The high degree of Internet interface communication and server-based processing in the DCVP permits fast and cost-effective operation, including the accumulation of a large and industrially relevant resume database, efficient verification process, and broad access to verified, secure resume data by potential employers. For this reason, as well as due to the savings from avoided duplication of effort, the costs of resume verification using the preferred DCVP of the invention is far less than the commissions charged to Job Seekers and/or Employers by traditional employment agencies or recruiters.

The terms DCVS and DCVP as used herein are intended as generic terms for the processes, methods, and combination of computer hardware, software and communication means of the invention. The term DCVS is generally used to indicate a preferred automatic server-based computer process administered by the DCVS, unless the context implies a manual or discretionary operation by DCVS staff. The method and process steps and algorithms of the present invention can be executed by means of means of software running on a suitable processor (in particular, a processor of a general purpose computer), or by any suitable combination of hardware and software. When software is used, the software can be accessed by a processor using any suitable reader device which can read the medium on which the software is stored.

Typically, the DCVP of the invention is implemented by code written in conventional computer or device languages. The software may be stored on any suitable computer readable storage medium. The computer readable storage medium can include, for example: magnetic storage media such as magnetic disc or magnetic tape; optical storage media such as optical disc, optical tape, or machine readable bar code; solid state electronic storage devices such as random access memory (RAM) or read only memory (ROM); or any other physical device or medium employed to store a computer program. The software carries program code which, when read by the computer, causes the computer to execute any or all of the steps of the methods disclosed in this application.

BRIEF DESCRIPTION OF DRAWINGS

The invention is described in more detail in the accompanying figures, drawings, and appendices, in which:

FIG. 1 is a schematic overview of the access structure of the preferred DCVP of the invention;

FIG. 2 is a chart showing the Internet interface structure of the preferred DCVP;

FIGS. 4A–D are flowcharts showing the resume addition, change, deletion and recovery processes, respectively, of the preferred DCVP;

FIGS. 8A–D are flowcharts showing the databank searching, auto-searching, Employer hiring report and Visitor resume viewing processes, respectively, of the preferred DCVP; and Appendix A attached hereto, which includes TABLES 1–14 describing the exemplary database structure of the preferred DCVP, as follows:

Figure 3B:
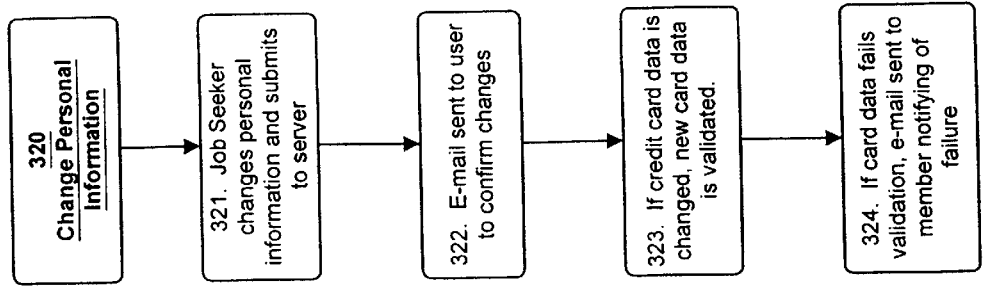
FIGS. 3A and B are flowcharts showing the Job Seeker enrollment and personal information change processes, respectively, of the preferred DCVP.

Table 1: Job Seeker Member Data;
Table 2: Secondary Passwords;
Table 3: Resume Items;
Table 4: Resume View History;
Table 5: Referral Partners;
Table 6: Referrals Tracking;
Table 7: Membership Plans;
Table 8: Resource Listings;
Table 9: Resource Referrals;
Table 10: Verification Services;
Table 11: Verification Service Personnel;
Table 12: Verification Service Activity Log;
Table 13: Employer Member Data; and
Table 14 A–G: Code Table Structure.

DETAILED DESCRIPTION OF THE BEST MODE OF THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications and patent applications cited in this specification are herein incorporated by reference as if each individual publication or patent application were specifically and individually indicated to be incorporated by reference.

The specific preferred embodiment of the DCVS and DCVP described herein is a present best-mode embodiment of the invention which serves an important economic and business need for reliable career-related data upon which to base hiring decisions. The particular website, webpage, linkage and server architecture described are elements of one exemplary embodiment of the DCVS and DCVP of the invention. In addition, a variety of alternative embodiments of the DCVS and DCVP of the invention can be employed in other commercial and industrial setting where there is a requirement for a controlled-interface multi-party data verification, certification and delivery system.

Along with the description below of the process steps of the preferred DCVP embodiment are included provisions relating to business considerations which are desirable optional aspects of a business which employs the DCVP of the invention. However, many alternate embodiments are feasible, and thus such business considerations are not intended as limitations on the scope of the DCVP of the invention.

The DCVS Internet servers are optionally hosted off DCVS premises by a third party. A communications link ties DCVS offices to the server for DCVS's own internal needs. The servers are preferably capable of handling a high transaction rate and provide uninterrupted around the clock availability.

DCVS Points Of Access, Contact Parties and Internet Interfaces

As shown in FIG. 1, there are included in the preferred DCVP of the invention two or more (preferably five) of the following categories of access to the DCVS site and data (corresponding to at least job seekers 1 and employers 2 and/or 3 of the contacting parties 1–4, 6 and 7 in FIG. 1). They are preferably browser-based contacts via Internet 100, and have access to the general "open" areas of the site, as well as specified limited-access portions of the site suitable for the process steps carried out with respect to each party, and are as follows, the contacts 1–5 being preferred.

1. Applicants or Job Seeker Members (also referred to as "Employee Members"): These individuals have access to all general areas of the site and to other areas that are restricted to Members-Only by use of a Login ID and password, or similar access control mode, such as fingerprint, iris recording (print), DNA, or the like.

2. Employer Visitors: Employer Visitors are individuals or other entities who have been given a secondary User ID and password sets by a DCVS Job Seeker Member to view the member's on-line certified resume. They cannot add or edit any resume data, or utilize any search mechanisms within the DCVS site.

3. Employer Members: Employer Members are an individual or other entity that has joined and become a member in DCVS. These Employer Members have the ability to call up specific resumes by either Login ID and Password, or by providing search criteria to call up a select list of Job Seekers.

4. Third Party Verification Services Vendors (Providers): The DCVS may verify resume data itself, although this function is preferably done by third-party providers. DCVS's third-party partners ("Verification Services") are companies, individuals or other entities that that DCVS contracts with to perform the verification process. These third parties need access to the data to perform the verification process over a secure connection. Their interface to the DCVS system is preferably browser based and provides tracking of their use of the DCVS system.

5. DCVS Internal: DCVS has access to the entire system, allowing DCVS employees access to password-protected data and directories as needed per their DCVS job description. The purpose for this access type is primarily for internal office operations such as accounting, statistical and marketing.

6. Marketing Partners: Optionally, the DCVS site may be a point of access for third party marketing partners ("Marketing Partners") for certain purposes. One preferred interaction with Marketing Partners is the placement of referral links and banners on third-party Web sites pursuant to Referral Commission Agreements. In an optional DCVS embodiment, such Referral Commission Agreements may be completed and carried-out through browser-based interaction.

7. Credit/debit Card Services: As described below, the preferred DCVP includes payment processing and debit/credit posting to accounts in financial institutions, including intercommunication means between the DCVS and credit/debit card services, such as Visa, Mastercard, and the like. However, these communications presently may preferably be by conventional means separate from the Internet, such as dial-in data connections, telephone authorizations, and the like, although entirely Internet-channeled transactions may become preferred in the future.

FIG. 2 shows schematically the DCVP/Internet interface structure of the principal DCVS contacts of FIG. 1. The DCVS 5 is shown on the left communicating through the Internet 100 with the specific parties on the right as identified in FIG. 1. The particular process categories of the preferred DCVP comprising the communications are identified by cross-references to FIGS. 3 through 8 in which these processes are depicted in greater detail. As can be seen, most process steps of the preferred DCVP involve an Internet contact initiated by one of the parties to or via the DCVS website.

As can be seen in FIG. 2, there are certain routine contacts encompassed by the preferred DCVP which are through the Internet 100 between contacting parties, without going through the DCVS website, such as Job Seeker-to-Marketing Partner link 101, 102 referral contacts. There are also non-DCVS contacts which may typically be off-net, such as Job Seeker-to-Employer contacts 103, 104.

The Internet interfaces shown in FIG. 2 may also be supplemented by other forms of contact, as desired, such as e-mail, telephone, conventional fax and mail, meetings and the like. As described more particularly below, contacts initiated to Members from the DCVS are typically by e-mail, or computer-generated e-mail, to permit rapid delivery and a high degree of automated processing of these communication steps.

Security

In the preferred DCVS system, the confidential nature of the data being maintained makes security critical. Each of the points of access may have different security methods. The preferred DCVS site is available to the general public with password-restricted areas for Member use only and secure areas for use by third-party business partners. All data, such as applicant personal information and resumes, are preferably transmitted encrypted using a secure connection such as Secure Sockets Layer (SSL), and once received at DCVS such data are stored in a secure, high-volume database. The preferred security arrangements may include the following relating to the contact parties described in FIGS. 1 and 2.:

1. Job Seeker Members have two sets of IDs and passwords that are Member-defined. The primary set gives the Member access to all Member-Only areas including full access to edit their resume data and personal information. The secondary set is given to potential employers (Employer Visitors) which allow them read-only access to the Member's resume only. The Member can maintain multiple secondary password sets so that they can monitor usage of each set by particular people (prospective employers). The Member also provides a Security Word (which may be alphabetic, numeric, or mixed alphanumeric) that is required to validate Identity for functions such as password retrieval, account changes and deletions.

2. Employer Visitors have access to the general areas of the site, and in addition may view (read/print/download only) resumes of the specific Members for which they have been given the secondary ID and password by that Member.

3. Employer Members have an ID and password that allows them access to the DCVS website per their particular (chosen) membership agreement.

4. Third Party Verification Services are preferably required to use digital certificates or connection to the DCVS server over a private network or tunnelling protocol. Their need for data access to the DCVS system is limited to those DCVS Member's resumes which are assigned to them for verification.

5. The DCVS office staff are preferably required to use security measures, such as iris scans, fingerprint scans, digital certificates and the like, or restricted to access over a private connection. Multiple levels of security may be established for use by DCVS internal employees. These levels may vary by the data that access is allowed to as well as read/write permissions.

6. Marketing Partners will preferably be employed in obtaining Member referrals, including Web-site base links, but will not typically require access to DCVS confidential resume or personal information databases. Optionally, secure contact may be established for communication related to referral commission accounts and the like. In addition certain Marketing Partnerships may optionally be established with providers of related services, such as professional recruiters and staffing agents. These persons may contract for DCVP services on behalf of their clients, either job seekers or employers. Member information exchanged with such Marketing Partners will preferably be subject to the same security provisions as set forth with respect to Job Seekers and Employer Members.

7. Credit card, debit card and/or ATM banking services are preferably employed in the DCVP of the invention. Credit/debit card and/or ATM information and charge authorization is preferably obtained from Members and Employer Members via the Internet. However, data exchanged with financial services, such as Visa, Mastercard and the like, will preferably be by data links from the DCVS offices and other means conventionally used in the industry in order to charge and credit member's accounts and to verify account status as needed. Other conventional payment methods may also be used.

General Features of the Preferred DCVS Site

The DCVS site of the invention preferably includes different sections for use by Members, Employers, Employer Members, or any others looking for information on DCVS and the services that are offered. Although it is preferred that pages closely resemble each other in their use of color, logo, fonts, and navigation methods, pages may be different among these attributes, or may only be common for selected classes of users, to provide an appropriate "look-and-feel". For ease of navigation within the site, all pages within DCVS will preferably contain links to specific pages, for example including:

The DCVS Home Page

Login Page to Access Members-Only Areas

Links to strategic partners

Send e-mail to DCVS

Home Page. The opening page (e.g., website homepage) is preferably fast loading and sized to fit inside a standard browser at a suitable screen resolution, e.g., currently 640× 480. This page preferably contains an appropriate DCVS logo and slogan, links to any new pages "inside" the website of Member interest, as well as links to all key areas of the site, for example the site pages and titles as described below:

Members Pages: Allows both existing Job Seeker Members and Employer Members access to their accounts and Member benefits after providing their Login ID and password.

Enrollment Pages: Allows an prospective Member to join DCVS.

About the DCVS: Provides information on the benefits of joining the DCVS along with a link to the DCVS Join page.

Look-Up-Resume Page: Allows a visitor to look up a DCVS Member's on-line resume. This requires that the visitor has, or was given, the DCVS Members secondary password set which is described below.

Career Resources Page: This link leads to a list of career web-based resources such as resume writing, further education, testing, career-specific certification services and job boards.

The DCVS site preferably has the following common functionality with respect to both Employee and Employer Members:

Login. When a Member attempts to go to any Members-Only areas (any controlled access pages and functionality appropriate to the particular membership status), either through clicking on a Members link within DCVS, a saved bookmark, or any other means, they are preferably presented with the Login page for access control. There are typically separate login pages specifically tailored to Job Seeker, Employer Members and Employer Members (and optionally also other contact parties, such as Verification Services and Marketing Partners). Alternatively, there may be a single login page, from which the specific primary or secondary ID automatically determines the access to subsequent controlled access areas, e.g., by comparison to a look-up-table. If the Member has already been given access to (i.e., "been in") the Member areas during the current session, they will not be prompted to Login again (unless "timed out" by optional time limits on inactivity). The Login page is typically a conventional window, with fields for entry of the Login ID, Password, and a submit button. There is a link available for the Member to use in case they have forgotten their password. If the Login fails, they are brought back to the page to re-enter the ID and given a message notifying them of the failure. After a successful Login, they are brought to their personal home page within DCVS. If the Member's Membership has expired, they are instructed to call DCVS to reactivate their Membership and supply their new billing information.

Maintaining Access State. After a Member successfully logs in, the Member's ID is maintained through one or more tracking cookies or any other method that allows the DCVS site to keep track of the Member while within DCVS. Doing so allows the Member to move among the Member Only areas without repeatedly logging in. As long the Member stays within the DCVS site, this access state is be maintained. Once they navigate to a page outside of DCVS their access state is lost and upon return to DCVS, must re-enter their Login ID and password to access Member areas. After a period of time of Member inactivity within the website, the DCVS system may provide that the Member's access state times out. This is done for security reasons in case the Member leaves the PC with the browser on DCVS. An added benefit is that automatically timing out/logging out the Member will help conserve server resources. Preferably, if a Member returns after being logged out, attempts to access a Members-Only area returns them to the Login page with an appropriate message asking them to Log back in. Alternatively, the time-out function can create a blacked-out or patterned security screen that requires re-entry of the password to render visible (at the Member's terminal) the area being navigated (selected for viewing by the Member).

DCVP Database Structure. An exemplary database structure of the preferred DCVP is shown in Tables 1–14. The specific types of databases are described below with respect to each particular DCVP functionality. Table 14A–G are listings of which are used in certain of the tables to reference data types, when a field within the table can hold different types of data. One of ordinary skill in the art will be able to make and use the DVCS and DVCP of the invention without undue experimentation, including the present best mode thereof and related database structures, by reference to these tables, the disclosure herein, and known art.

Job Seeker Member Specific Functionality

As shown in flowchart form in FIGS. 3 and 4, the DCVS site has a number of functionality which are specific to the Job Seeker or Employee Members. In general, the organization of process steps in the Internet user interface of the preferred DCVP corresponds to sequentially displayed webpages, and thus the terms "steps" and "pages" will often be used synonymously. It is understood, however, that the preferred DCVP steps may be carried out with other alternative webpage organizational structures. Likewise, it should be understood that the sequence of steps or pages of the DCVP described herein is exemplary, and the particular steps may alternatively be carried out in other operative sequences. The Job Seeker specific functionality may, for, example, include the following:

Job Seeker Member Enrollment 300. The Member enrollment process is shown in the flowchart of FIG. 3A. The initial enrollment page (or step) 300 provides for an individual Job Seeker to join DCVS, following initial website contact. The initial contact 300 may be either direct, such as by opening the DCVS via Internet browser URL input or search engine results selection, or may be indirect, such as by clicking a referral link in a third-party Marketing Partner's website. Upon selecting the enrollment page, the Job Seeker is preferably assisted in the process of enrolling by being provided by the DCVS with a time estimate for how long the enrollment process will take. Also, during enrollment, the user has the ability to bookmark the current page. This allows the user to return to the page to finish the enrollment without losing any data if unable to finish the enrollment earlier.

A link is also preferably located on the screen of the enrollment page 300 that allows the user to summon a on-line DCVS customer service person or "NetRep" 301. A NetRep, if called, assists the user in filling out any required data and answers questions concerning DCVS. The NetRep may interface with the Member or prospective Member by use of a DCVS module comprising conventional software which opens a confidential "chat session" inside a frame within the current DCVS webpage. Through this chat session, the user can ask the NetRep questions on the DCVS service itself or seek help on using the DCVS web site.

Although only depicted in FIG. 3A with respect to the Job Seeker enrollment process pages 302–306, a similar NetRep link 301 and assistance process may optionally be included on other DCVS user interface webpages to provide assistance to Job Seekers, Employee Visitors and Members, and other contacting parties. The on-line NetRep process permits the maximum use of computer-administered user interface DCVP steps within the website for high efficiency and low labor costs, while having personal contact assistance readily at hand when this is needed for effective customer service.

When an individual enrolls to become a DCVS Member, they preferably first supply their resume data 302. This may be by means of a resume data entry page 302, opened from a link on enrollment page 300. The resume data entry page may provide a data entry form for the entry of specific data items. The detailed description of the resume data entry process is included below with respect to FIGS. 4A–D, which also include post-enrollment processes whereby an enrolled Member may add new or additional resumes (according to the membership plan chosen), deleted resumes, and recover deleted resumes replaced. The resume data entry process is carried out in substantially the same manner at initial enrollment and in later Member resume modifications.

After the resume data is entered on the data entry page 302, the data form may then be submitted by clicking a webpage button. Optionally the data entry page may be checked by the DCVS system for missing or inconsistent data at this stage, and completion/corrections/resubmittal requested.

After supplying and submitting the resume data, the Job Seeker preferably is displayed a search criteria page 303, in which to select a variety of checkboxes and list-boxes that further define themselves and the job they are seeking. The search criteria information preferably includes at least the following:

Desired salary
Geographic location
Industry
Level of education
Position
Willing to re-locate
Consultant, full-time, part-time The "search criteria" information 303, after submission, is maintained in the DCVS database records associated with the particular Job Seeker Member. The preferred DCVP includes database searches initiated by Employer Member to match Job Seeker criteria with corresponding search criteria submitted by Employer Members, as is further described below with respect to FIG. 8.

After submission of search criteria, the Job Seeker is preferably presented with a personal information entry page (page 304 of FIG. 3A) Data collected at this point may include, but is not limited to:

| Name | statement of career goals and philosophy |
|---|---|
| Date of Birth | awards |
| Place of Birth | membership/organizations |
| Social Security Number | political offices held or sought |
| Drivers License state and number | Military Service (y/n) |
| | If in Service, also provide: |
| Postal Address | Date range of service |
| E-mail Address | Branch |
| Membership type (dropdown menu) | Type of discharge |
| | Billing information |
| education | Password |
| publications | Login ID |
| accomplishments | (used with password to log into DCVS) |
| appointments | |
| prior positions | |

The primary login ID and password entered during enrollment will allow the Job Seeker access to the Members-Only areas of the DCVS site (see Job Seeker start page, below), once the Member Account has been created. The creation of secondary login IDs and passwords (for use by Member-selected prospective employers to view resumes) is described below with respect to FIG. 6A.

Following submission of personal information 304, the Member is preferably presented with a choice of Membership Plans. This may be included on page 304, or may be on a separate sequential page, such as is shown in FIG. 3A as membership plan/billing option page 305. The enrollment fee for an Employee Member is preferably a modest fee to encourage broad participation in light of the commissions which are payable under the preferred Applicant Enrollment Agreement (AEA) upon hiring. Optionally, if the Member fits into a specified category (e.g., level of education, salary history, etc.) the resume certification may optionally be free, otherwise they will be charged the cost of their certification. If they do not fit into the specified category, they may still be a DCVS member, they just have to pay additional fees for the certification and verification processing. The Member preferably may also choose other attributes of their membership, including, for example, specific duration of membership, and payment options such as third party payment, and gift certificate 305. Specific membership plans may also provide for various levels of service, including multiple concurrent certified resumes, different numbers of secondary password set, and the like.

The exemplary database structure of the preferred DVCS for membership plan data is shown in Table 7 of the Appendix. This table contains fields that define Membership plans that are offered by DCVS.

The Job Seeker is preferably given various option for paying for their DCVS Membership. These may include:

Credit/debit card through web site
Credit/debit card over the phone
Credit/debit card via fax
Personal check
Charged to their home phone Depending on the payment option chosen, different instructions and fields are presented to the user to enable them to enter the data. In addition to the above payment options, the user may elect to have a third-party pay for their Membership. This third-party can pay via any of the above options. If third-party payment is chosen, the user will enter in the Name, Address, and any other information required for the particular payment method chosen.

In addition to Membership Plan and billing/payment options, there are preferably additional account options available for the Member, which may be set through entries or check-off boxes on Page 5.

These preferably include:

Show/Hide Resume: Setting this allows or disallows someone else from viewing the Resume on-line, even with a valid login ID and password for that resume.

Automatic Rebilling: This setting automatically renews the Member's account at the expiration of its current term using the same Membership plan.

Send e-mail to registered e-mail account, or other

Display graphics on site or text only (y/n)

Receive special offers via e-mail from DCVS

If the Member prefers, all e-mail correspondence between themselves and DCVS may be done via a third-party web service that provides encrypted e-mail and confirmation of receipt.

At the bottom of the page, after filling out the above information, the user clicks a Submit link which starts the Personal Data Submission Process outlined below.

Following the Job Seeker's selection of membership, payment options, and upon clicking "Submit," the user is brought to a information verification/agreement page 6 verifying the personal data/membership/billing information that was entered and displaying a detail of the charges to be charged to their chosen payment option. An Applicant Enrollment Agreement (AEA) is preferably displayed on page 5, to be accepted in order to proceed. In the AEA it is made clear that the payment authorization covers membership or membership plus the cost of certification in case the individual's resume does not meet our criteria for free certification. Conversely, the membership may be free, for a defined period, with fee based certification.

The Applicant Enrollment Agreement also preferably specifically authorizes DCVS to release background data on the Job Seeker Member as needed to obtain verification of the resume. This statement discloses what DCVS may do with information received from the applicant, or obtained from third parties about the applicant. The Applicant Enrollment Agreement also preferably contains an authorization form, which authorizes third party custodians of information (former employers, educational institutions, and the like) to release such information to the DCVS or its agents during the verification process.

Upon clicking "I Agree" the enrollment data is sent 306 to the DCVS server in order to create the new account and process the charge. After the enrollment data is validated for completeness and submitted, an enrollment confirmation page 307 is presented informing the applicant/member that their application is being processed promptly and they will receive an e-mail notification, preferably within 24 hours, confirming account status.

Payment of the enrollment fee is then verified in step or page 308, according to the specific payment means selected by the Job Seeker. If payment is made via credit/debit card, the credit/debit card data supplied by the applicant is preferably spooled out to a file to be processed in bulk at the end of the day with any other new charges. If payment is made via other means besides a credit/debit card via the DCVS web site, the member is notified that they will receive notification of payment via e-mail once their payment has been received and processed. This is preferred in the case of a check or 900 number which requires the user to take further steps on their own.

If the credit/debit card authorization (or other payment means) fails in step 308, an e-mail is sent to the user (step 309) notifying them of the problem along with a link in the message leading them to a page where they can correct the card data and resubmit.

If the credit/debit card authorization is accepted (or other payment means is confirmed), the user becomes a Member and an e-mail is sent to the Member (step 310) notifying them that their account has been created, and that their resume (if it has been submitted during initial enrollment) has entered the verification process. Upon payment confirmation and creation of the account the Member's password and login ID is activated and the Member may access to any Members-Only areas of the DCVS website, including the Job Seeker Start Page (step 311).

Job Seeker Member Start Page. Preferably, a Job Seeker Member Start Page is the main navigational point into all Member-Only areas, and is organized in a clear self-explanatory manner to allow convenient access to the various services, functionalities and resources (collectively "features") available to DCVS Members. Links with explanatory text may be provided directed to each such feature. Preferably, the Job Seeker can accomplish whatever is needed on a particular site visit without leaving the Members-only areas, once logged in.

Links contained on this page may include, for example, the following:

Links to new DCVS features, articles or other resources available

Figure 3A:
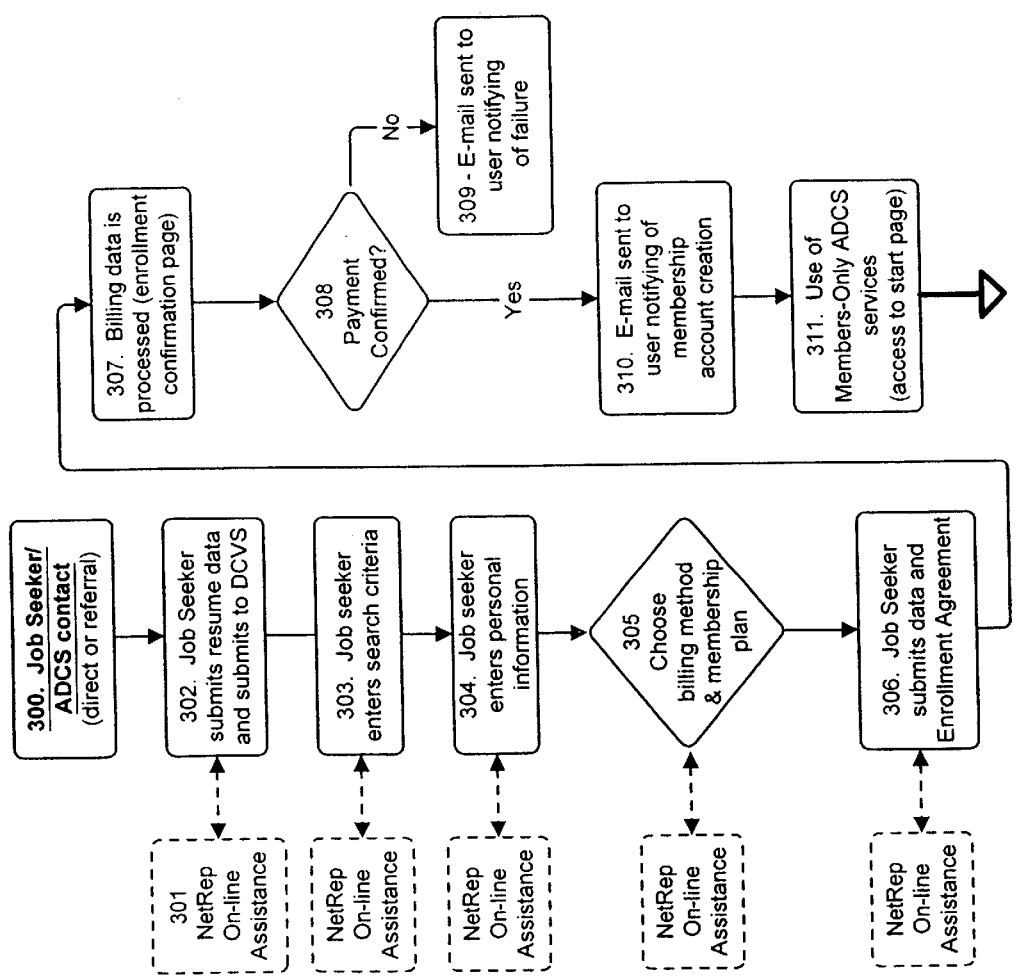

Change Personal Information, primary password or search criteria (see discussion of FIG. 3B)

Add New Resume (see discussion of FIG. 4A)

Change Resume (see discussion of FIG. 4B)

Delete Existing Resume (see discussion of FIG. 4C)

Recover Deleted Resume (see discussion of FIG. 4D)

Figures 6A, 6B, 6C, 6D:
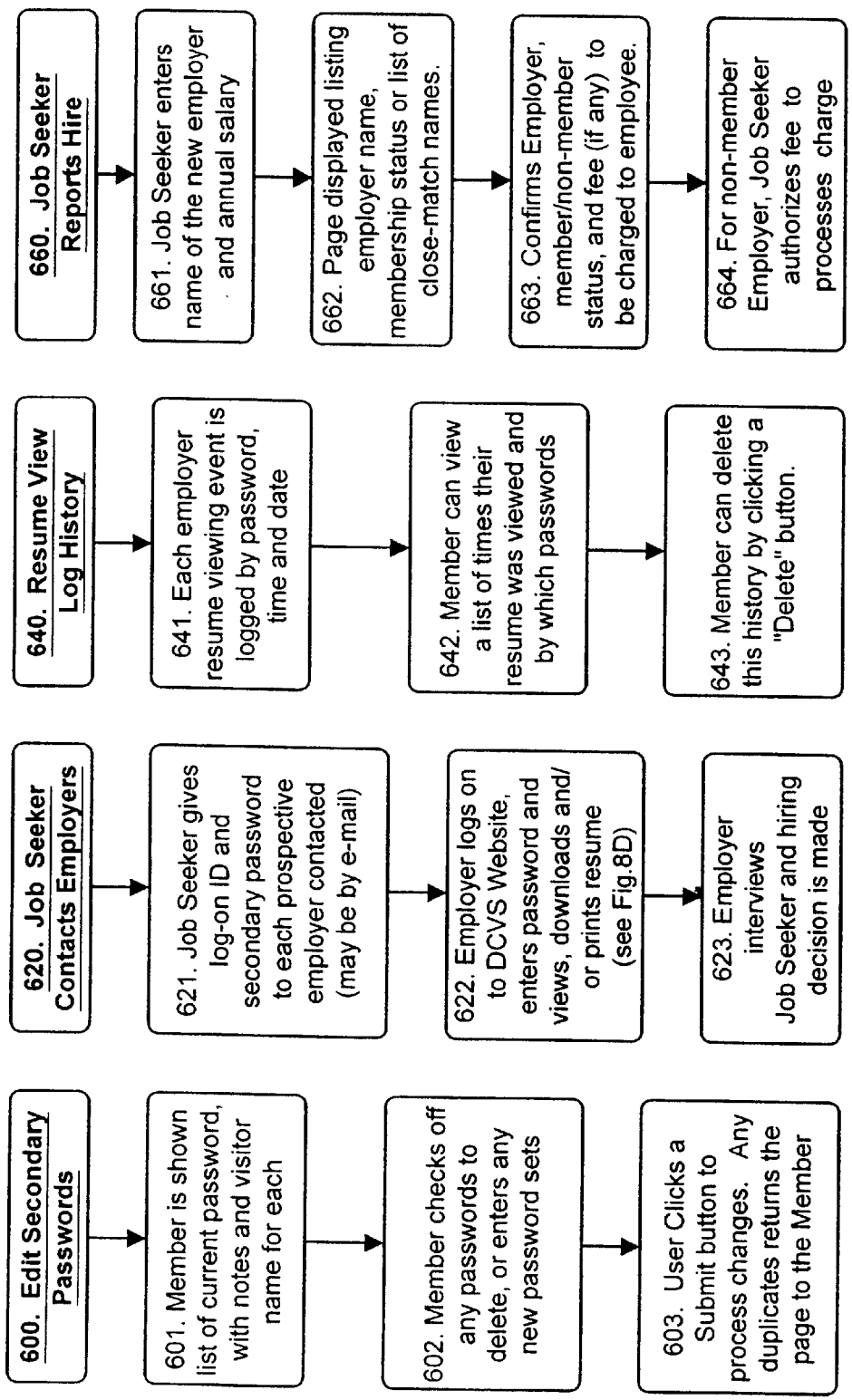
FIGS. 6A–D are flowcharts showing the secondary password editing, password use, view history log, and Job Seeker hiring report processes, respectively, of the preferred DCVP.

Edit Secondary IDs and Passwords (see discussion of FIG. 6A)

Resume View History (see discussion of FIG. 6C)

Report Hire (see discussion of FIG. 6D)

Enable Resume to be listed in DCVS job bank for Employer Member Searches (see discussion of FIG. 8A)

Request NetRep assistance

Member Resource areas

Send e-mail to DCVS

In one embodiment, these links (preferably as simplified icons) are also included in a "side bar" type frame adjacent other pages, to allow convenient cross-travel within the members-only areas.

In addition, the Job Seeker Member Start Page may optionally serve as a notice page or "mail box" for member-specific messages, such as billing related information and the like. These messages may be stored in-queue in the DCVS server database until the particular Member logs in, and then displayed automatically. These start page notices can supplement (or replace) conventional e-mail messages or other means for DCVS-initiated communication with the Member. Such notices may be automatically or manually generated.

Changing Job Seeker Personal Information 320. The preferred DCVS provides that, should the Member ever need to change their personal information data, the Member may click on a link "Personal Info", once logged into the Members-Only area, to allow them to change this information as depicted in FIG. 3B. The link selection displays a personal information edit page 321. Certain data items will preferably need to be confirmed once they are changed. These are:

E-mail Address

Credit/Debit Card Number

Credit/Debit Card Expiration Date

After any changes are made, a confirming e-mail is sent (step 322), preferably to both the former and the new (if changed) e-mail address. The purpose of sending a message to a former e-mail address is to increase security by permitting a Member to detect any unauthorized account data changes.

If a credit/debit card number was changed, it is verified (step 323) that it is a valid card that DCVS can use for any future billings for that client. If the card fails this validation, a message informing the Member is sent (step 324) to both their e-mail address and the Member Start Page.

The Job Seekers search criteria may be changed by entries in boxes provided under the "change personal information" page, or a separate "search criteria" page and start page link may optionally be included.

The exemplary database structure of the preferred DVCS for job-seeker specific data is shown in Table 1 of the Appendix. This table contains data that is specific to a Member with the exception of the resume data.

Add New (or Initial) Resume 400. As shown in FIG. 4A, when the Member chooses the start page link to enter a new resume, they may be presented a resume data entry page 1 that contains appropriate fields to enter in their Resume Data. This page may also be used, in the event that the Job Seeker Member did not enter resume data at initial enrollment. The process of entering resume data may be substantially the same regardless of whether the resume entry process is integrated with the initial enrollment (FIG. 3A) or whether the resume data is entered after the membership account is created (FIG. 4A).

According to the preferred Basic Membership Plan, the Job Seeker is presented with a set number of fields to enter, such as Education, Employment, and any Awards data to be verified. The data for each item may include:

A date or date range depending on the item to be verified

A description of the item

A name and phone number to assist in the verifying data for this company or educational institution resume item (e.g., phone number of a former employer's HR department).

If a Member needs more fields for one or more specific item types, underneath each section type is a list box that the Member selects the additional number of items needed. By clicking a button next to the list box, the page is refreshed containing the previous fields and their keyed in data as well as the new additional fields requested. Next to each item listed is a checkbox labeled Delete. If when refreshing the page as described above a Delete checkbox is checked, then that item and its contents will be deleted when the page is refreshed. Regardless of the number of fields deleted, the page will display at least the appropriate number of fields as allowed in the Membership plan.

Once presented with the data entry page 401, the Member may either type in data by keyboard, or optionally the Member may copy-and-paste text from other application windows open on the Members desktop/laptop computer system using a "clipboard" type editing features typically included in conventional computer operating systems. For example, the Member may select, copy and paste descriptive text pertaining to a particular resume data item from a resume file concurrently open on a conventional word processing application, such as MS Word or WordPerfect, and the like. The page 401 data form may include both specific data-type fields (e.g., numeric fields for dates, telephones numbers, and the like), special purpose text fields (e.g., text fields for addresses and the like) or general text entry fields (e.g., for descriptions of job duties and accomplishments). The data entry may be structured to assist in use of optional expert systems in the verification process, described further below with respect to FIG. 5.

If the Member desires, they can send a current hard copy Resume either via Fax, mail or e-mail that DCVS will key in for them. The cost of this service may depend on the Membership Plan selected by the Member. Other optional means of resume data entry may be included in the DCVP of the invention, for example including submittal of resumes by electronic transmittal of word processing or text files, such as by e-mail attachments or other conventional electronic file transfer means.

Optionally the data entry page may be checked by the DCVS system for missing or inconsistent data at this stage, and completion/corrections/resubmittal requested.

After all the Member's data is entered on the data entry page 401, the data form may then be submitted by clicking a webpage button. The preferred data submission routine includes self-check and correction features (step 402 in FIG. 4A). When the DCVS server receives the data, the system discards any records whose fields are all empty and validates the other fields looking for invalid entries such as missing dates or text in the date fields. If validation fails, the page with all the entries is returned to the Member with an appropriate message referring to the failed item. After the Member corrects the entries, they restart the Submit Data process by clicking the Submit button again.

After the validation process step 402 is complete, a data acceptance/authorization page 403 is presented to the Member showing the resume data, an authorization agreement verification authorization, an "OK" button, and a textbox control. If the Member wants to make any changes to the data they are requested to go back to the previous page to make their changes. The authorization agreement preferably specifically authorizes DCVS to release background data on the individual as needed to verify the resumes data. This statement also discloses what may be done with information received from the applicant, or obtained from third parties about the applicant. If the Member is satisfied with the data and has read the authorization agreement, the user types their security word into the provided textbox control to further verify their identity and clicks the "OK" button to submit the data to the DCVS database.

Figure 5:
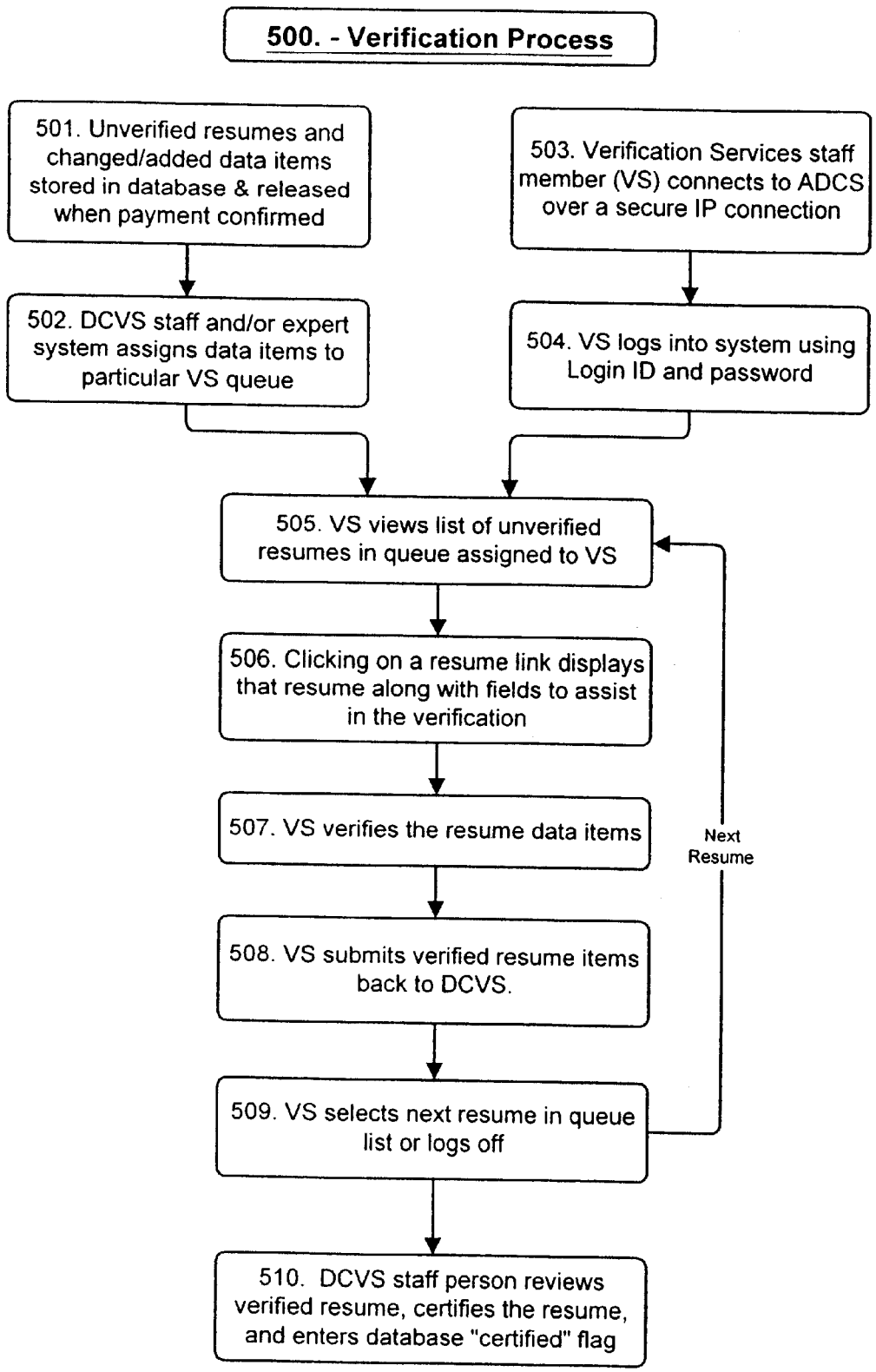
FIG. 5 is a flowchart showing the resume verification and certification process of the preferred DCVP.

Following acceptance and authorization, the resume data is then stored in the DCVS database pending verification (See discussion FIG. 5).

Modify Existing Certified Resume 420. As shown in FIG. 4B, in the preferred DCVS, a Member may delete previously entered and certified Resume Data items or add new items. For data validation purposes, resume items previously certified preferably cannot be edited, only deleted. When a Member clicks a link to modify the DCVS, they are presented with a modify existing resume page 421 that lists all of their Resume Data in read-only format. Next to each item in each section are two option buttons:

Delete

No Change

The default is "No Change".

If the Member wishes to Change or Delete an item, they click the appropriate option button next to the item (step 422). Also, below the section for each data type is a list box were they can choose a number to add resume items.

After the Member has made any needed selections, clicking a button on the bottom of the screen refreshes the page and preferably performs the following actions for each option button selected (step 423):

Delete: These records are marked for deletion but not yet deleted.

No Change: These fields are displayed in read only fashion.

After submission, a change confirmation page 424 is displayed. If the Member has requested additional items for any data type, these new blank records are inserted at the bottom of each section. At the bottom of the page may be a small frame listing the estimated charges for this modification/re-certification, if any, according to the specifics of the Membership plan. Preferably before any processing occurs, the Member is must confirm any Resume Items that were previously marked for deletion. Next to each item is a box that needs to be checked to verify that the item should be deleted. This box is preferably checked by default. If they click an OK button, any checked items are permanently deleted. Any items that are unchecked when the Member clicks OK are not deleted from the database. The change confirmation page 424 preferably includes authorization for information release, as for a new resume. Following confirmation and authorization, the resume any new or changed resume items are then stored in the DCVS database pending verification (See discussion FIG. 5).

Delete Existing Certified Resume 440. In the preferred DCVS of the invention, a Member may delete their Resume maintained by DCVS. When a resume is deleted by the Member, it is actually flagged so it is not listed as an active resume, but can be recovered by the Member later if desired.

As shown in FIG. 4C, clicking on a Delete Resume link brings them to a delete resume page 441 to permit them to select and delete the resume. The page preferably includes text giving them ample warning of the process that they are about to carry out, and also fields that require them to verify their identity. To delete their resume, the Member must type in their Security Word and click a button labeled "Delete Resume."

Clicking the "Delete Resume." button sends the page to the server where the security word is verified, and if correct, the resume is flagged as inactive so it is not viewable by the Member or any others (step 442). After the resume is flagged as inactive, in the DCVS database, the user is returned to the Member Start Page.

If the flagging fails for any reason, such as an incorrect Security Word, the Member is returned to the Delete Resume page, notified of the reason for failure and given the opportunity to try again (step 443).

Recover Previously Deleted Resume 460. As shown in FIG. 4D, if the Member wishes to recover a previously deleted resume, clicking the "Recover Deleted Resume" displays the recover resume page 461. The page preferably contains hyperlinks to previously deleted resumes. Clicking on a link brings them to a read-only view of the selected resume (step 462).

Clicking on a button labeled "Recover" (step 463) sends instructions to the DCVS server to set a flag for the resume in the DCVS database is as Active. This preferably allows the resume to be viewed by the Member and others, with an appropriate Login ID, password, and Security Word.

The exemplary database structure of the preferred DVCS for resume specific data is shown in Table 3 of the Appendix. This table contains the resume data to be certified. It is linked to the Member table on a 1-to-many basis by the Member ID. Each resume item is stored in it's own record. Data is stored stating who certified the item, when it was certified, and any notes entered by the verification specialist.

Edit/Issue Secondary Logon IDs and Passwords 600. As described above and shown in FIG. 6A, in the preferred embodiment to the DCVP of the invention, a Job Seeker Member may create a secondary set of login ID's ("logon") and passwords. A secondary logon and password may be given by the Member to potential employers or other persons (collectively "Employer Visitors") to allow them to log into the portions of the DCVS Web site for resume viewing, and which enable them to view the Member's certified resume in a read-only view. The maximum number of secondary passwords that each Member can maintain may optionally be limited by their particular membership plan.

A secondary password set preferably includes the following items:
  Login ID
  Password
  Optional Description The Description field may be used as a note for the member of which employer or person this password set is intended to be used by, or for any other notes the Member desires.

As shown in FIG. 6A, in the preferred embodiment, when the Member opens the edit secondary passwords page 601 any existing secondary password sets are listed in read-only fashion as text. To the right of each password set is the Member created description for this set, followed by a number that represents how many times that set was used to access the members DCVS.

To the right of that, is a check box that if checked off, will cause that specific set and associated information to be deleted when an Update button is clicked on the page. When this Update button is clicked (step 602), all checked off items on the page are deleted out of the DCVS database on the server and the page refreshed. The Update button also preferably performs other related actions. Under the existing password sets are an appropriate number of text boxes that will allow the member to create additional password sets. Preferably the Member may disable or delete the secondary password specifically, it the Member later decides to withdraw permission. The Member preferably may disable the resume from being viewed, for example, when editing or updates are needed.

For example, if the Member is allowed 10 sets of secondary passwords by the chosen Membership Plan, and already has created 2 secondary sets, there may be 8 rows of fields underneath the existing passwords, including of 3 columns for the Login ID, Password, and description. To create a new set, the Member selects an empty row of fields and enters data into the three fields provided.

Each Login ID preferably is required by the software to be unique in the DCVS database. After the Member types in any new password sets, by clicking the Update button the new sets are sent to the DCVS server for validation, checking for duplication (step 603). If a Login ID is already being used by another Member, the page is returned to the Member listing all failed items with an appropriate graphic denoting the error next to the set(s) in question. At this point, the Member can change the entry or choose to delete it. Any sets that passed validation are listed at the top of the list along with the previously existing password sets. When the Member is presented with any failed items, they can either correct them or continue onto other web pages without needing to take any action.

The exemplary database structure of the preferred DVCS for secondary password data is shown in Table 2 of the Appendix. This table stores the secondary password sets for Members.

Validation Of Data Entries. When the Member has completed changes to data, such as resumes items or password sets, the following validation is preferably done:
  If a Login ID is changed, check to see if it is already used by another Member.
  If any passwords are changed, the two password fields are compared to verify that they match.
  Credit/Debit Card number is valid.
  If any required fields are empty.
  If any of these items fail, the same page is returned with the changed data and appropriate messages above the fields that failed verification. If validation changes pass, the data is used to update the database and an e-mail confirmation is sent.

Post-Resume Certification Processing. Optionally, the Member may be permitted to customize the viewing format of the certified resume (without changing content or voiding the certification), including modification of type faces, font colors, background images, and general aesthetic arrangement of their resume.

In another optional aspect of the invention, the Member may be permitted to create an inclusive master certified resume (with all pertinent data items verified). From this master certified resume, the employee may be permitted to select a sub-set subset of career data items of relevance to a particular job opportunity or employee, without voiding the certification of the included data items. In this embodiment, the data items are discrete "certified career objects", that may be manipulated and selected while carrying their certification attribute with them.

The certified career object aspect of the invention permits the Member to avoid redundancy in career data of lesser relevance to a particular job position sought, while maximizing the content of relevancy to that position. Thus the flexibility of the conventional resume may be approximated, without loss of the certification attribute.

In another optional aspect of the invention, the Member may be permitted to include more than one resume as a package, for example, a brief "screening" resume may be compiled for use by an employer at the initial screening stage, with a more extensive companion resume made available for later interview stages of the hiring process.

Editing or modification of the substance of a certified item, so as to require the re-verification of that item, is performed as described above under the heading "Modify Existing Certified Resume".

Job Seeker/Employer Contact and Secondary Password Use 620. FIG. 6B depicts the process of use of the secondary passwords. When a DCVS Job Seeker Member wants to let a potential employer or other person (collectively "Visitor") view their certified resume on-line, the Visitor is given the Member's secondary Login ID and password (step 621).

The secondary Login ID and password are used only to view a read-only version of the Member's Resume (step 622). As described above, preferably the Member may disable or delete the secondary password specifically, it the Member later decides to withdraw permission. Likewise the Member may or disable the resume from being viewed, for example, when editing or updates are needed.

Typically the Employer Visitor then makes a hiring decision based on the certified resume and personal interview (step 623)

Certified Resume View History 640. As depicted in FIG. 6C, a Job Seeker Member is able to call up a history of when their resume was viewed on-line by a visitor. Each time a Visitor views a particular resume, a log entry in the DCVS database is created recording the date and time, and by whom, the resume was viewed (step 641).

By clicking on an appropriate link within the Members-Only area after the Member has logged in, they are shown a resume view history page 642 displaying the view log history.

The Member may manage the history log by deleting history entries, as desired (step 643). Next to each listing is a Delete checkbox. If the Member checks off one or more checkboxes, clicking a Remove button on the bottom of the page refreshes the page, deleting the specified item(s) from the View History database. Another button is on the screen labeled "Remove All." Clicking this button refreshes the page and deletes all of the view history from the database for this Member. This deletion occurs regardless of any items being checked off for deletion or not.

The exemplary database structure of the preferred DVCS for resume view history data is shown in Table 4 of the Appendix. This table contains a history of when resumes are viewed on line, so that a Member to be able to tell when and how many times their online resume has been viewed.

Job Acceptance And Job Seeker Hiring Report 660. As shown in FIG. 6D, in the preferred embodiment, by clicking the "Report Hire" link on the Member Start Page the Job Seeker Member is able to report their hire by means of a hiring report page 661. Per the preferred Member agreement, when a Job Seeker Member finds employment they are to report it to DCVS to arrange for appropriate payment of any fee. If their new employer is not a Member the Job Seeker/Employee is responsible for payment of the fee. If the employer is a member, the employer will pay a fee according to their membership plan chosen.

The Member supplies three pieces of information in the spaces provided:

New Employer

Annual Salary

Hide/Show Resume

On page 661 the user types into a text box the annual salary of their new position, and can also check off a box that will hide their resume from other Employers Members or Visitors if desired. To report an employer the member may do so in one of two ways, either by typing the employer name in a text box on the page and pressing a submit button or by selecting the name from a drop-down list of hyperlinks of on the same page. The list of hyperlinks is searchable alphabetically.

Depending on method chosen the Member is brought to the employer member match page 662 by clicking the company name or clicking submit. If the employer name typed into the text box (if any) on the previous page does not match against a list of DCVS Employer Members, the Employee member is preferably given a hyperlink list of possible near-matches.

If one of the presented Employer Member names is the one hiring the Job Seeker, clicking on it will bring the member to the fee confirmation page 663 which includes a confirming notice that the fee will be charged to the Employer. If a desired match is not found, clicking on a "Continue" link brings the user to the fee confirmation page 663, which in this case will include a notice generated by the DCVS server showing the fee calculated to be charged to the Job Seeker.

By clicking "Accept" on page 663, the user acknowledges that they will be responsible for the calculated fees, if the Employer is not a Member, and payment authorization page 664 is displayed, on which the information just supplied and actions about to be performed are presented. For example, if the Member is responsible for payment the amount to be charged to their credit/debit card and new employer is confirmed. The Member can now click a submit button to finalize the process where they will be returned to their Start Page, or can move back to their prior pages.

Verification Services Specific Functionality

Processing, Verifying Data And Certifying A Resume 500. FIG. 5 shows the preferred resume data verification and certification process of the DCVP of the invention, comprising the following steps:

Step 501. New uncertified resumes requiring verification, and added or changed data items from existing certified resumes, are processed by the DCVS database server software, flagged as "not verified", and stored, if desired, until the Members enrollment or change fee is confirmed.

Step 502. The unverified resume data is assigned to one or more Verification Services (VS) for verification. Preferably the VS are independent services or contractors selected to efficiently verify resume data.

If desired for efficient processing, the resume data items may optionally be categorized, and divided among different VS. Depending on the type of resume data supplied by the Member, different parts of the resume may be verified by different VS specializing in particular types of data, such as employment history, educational history, military service, chronological or geographical distribution. Resumes may then be assigned to a VS based on a mix of their area of specialization and availability, and preferably each resume is given to the VS who can most easily handle the extra workload at that time. This allows resumes to move through the certification process as soon as possible. Optionally, certain VS can be used as staff specialists of verifying educational data while others can specialize in verifying employment data.

The selection of the scope of data to be verified may optionally be a function of the membership plan, with differing scope of verification and certification for different plans. The selection of specific data items or objects in the resume to be verified and the selection of which VS to assign the verification tasks, may be made by DCVS staff, or may optionally and preferably be made automatically or semi-automatically with the assistance of an expert system.

The expert system may identify key-word relationships in the resume data indicating pre-selected data types and categories. The expert system may automatically assign verification tasks, or alternatively the expert system may highlight and display or otherwise identify tentative data items and VS task assignments, in the manner of existing spelling and grammar-check systems employed in conventional word processing software applications. The expert system can also pre-check certain data items for consistency, such as possible chronological inconsistencies between employment or educational items, and the like. Once the resume data items are assigned to a particular VS, they are stored in a queue specific to that VS.

Step 503. In the preferred embodiment of the DCVP of the invention, the transmittal of verification tasks is preferably by browser based Internet interface with the VS, although other means such as mail or e-mail may be used. Preferably a secure connection is used.

Step 504. The access used by the VS is preferably includes security means, such as by utilizing digital certificates. For example, once connected, the VS employee or other personnel is required to Login in using a unique login ID and password to access the DCVS system. For monitoring purposes, each login by a VS employee is stored in a database record. Once logged in, this users ID is used to track their usage of the system and note who is working on specific resumes.

Step 505. In the preferred embodiment, After the VS staff member has logged in, each resume currently assigned to the VS is listed by ID in a resume queue list page, and the VS staff member selects a resume to be verified by clicking on the resume ID. When a Resume is certified by two or more VS, each VS preferably only has access to their particular data type or items. This prevents one VS from overwriting or otherwise changing another VS's work. In addition, preferably if any resumes listed are currently being processed by the VS company, the name of the person doing the work is displayed next to the resume and this resume is locked from others to work on at this VS. This "lockout" feature may optionally be used to assign the same resume to more than one VS, with the resume being verified by the first available VS.

Step 506. The VS preferably opens a webpage (verification task page) which may include resume displays with specifically highlighted or otherwise identified data items to be verified. Alternatively, the verification task page may include a formatted display of the expert system output, including, for example, the data item description, keyword highlighting, and pre-check information, if relevant to the verification task.

For example, in the preferred DCVP embodiment, the VS employee is presented with a hyperlinked resume display, from which by clicking on a particular resume link, the VS employee will be presented with a new page listing the Resume items along with appropriate fields to supply verification information such as who verified the data and any other notes for these items.

Step 507. The VS verifies each data item according to the assignment. The term "verifies" may include determining the following:

Whether the data item is demonstrated to be correct.

Whether the data item is demonstrated to be incorrect.

Whether the data item is demonstrated to be partially correct.

Suggested changes or corrections to the data item based on investigation.

The unavailability of information needed to verify.

The specific source of verification information, if relevant.

The DCVS preferably establishes standards and guidelines to assist the VS in verification, and to assure uniformity of VS performance.

The VS employee preferably has the option of entering a note or explanation for each item for internal DCVS quality control or other purpose and not available to the Member.

Step 508. The verified data items, marked appropriately to the findings, are then submitted by the VS to the DCVS, preferably by entry of information in the verification task page. Once the VS employee has completed their work, by clicking on a submit button, the, new data is sent to the DCVS server with the resume being removed from the VS's queue and a message sent to a DCVS manager notifying them of the completed work. When a resume item is verified by a VS employee, the DCVS preferably documents the ID of the VS employee and the current date/time.

If the VS employee has not yet finished their work and needs to exit the system, by clicking on a Postpone button, any changed data is submitted to the DCVS server, but the Resume stays in the VS's queue for them to resume their work later. If a VS can not verify an item, the VS is able to note that, and when the process is complete, the DCVS Member is notified of the problem. At that time, the DCVS Member supplies additional information to help in the verification.

Step 509. The VS employer selects another resume to verify by returning to the resume queue list page (Step 5) or logs off the DCVS server.

Step 510. A DCVS employee approves the verification, now making the resume "Certified" by the DCVS. The resume may optionally also be disapproved for certification if the DCVS employee determines the data items substantially failed the verification process. Once the resume is certified, it is viewable by the Job Seeker Member, Employer Members and any other entity given secondary passwords/logon, unless the resume is disabled by the Job Seeker. Optionally, verification information may be embedded in the resume itself as hyperlinks, footnotes etc. Preferably the specific items verified are highlighted or otherwise identified on the certified resume as displayed to viewers.

The exemplary database structure of the preferred DVCS for Verification Services data is shown in Tables 10–12 of the Appendix as follows:

Verification Services entity data is shown in Table 10. This table contains information identifying the third-party verification specialists that DCVS uses.

Verification Services personnel access data is shown in Table 11. This table maintains a list of the employees or staff of the third-party VS who have access to certify items. This table pertains to logging a VS activity within the DCVS system.

Verification Services resume activity data is shown in Table 12. This table logs database actions performed by a VS, such as logging in/out, requesting a resume, updating data, and the like.

Employer Member Specific Functionality

As shown in flowchart form in FIGS. 7 and 8, the DCVS site has a number of functionalities which are specific to the Employer Members. The preferred DCVP has a browser-based interface for Employer Members generally similar in format and structure to that described above with respect to Job Seeker Members, but tailored to the specific operations and information relevant to Employers. The interface may include the following:

Employer Member Start Page. This Start Page is the main navigational point into all Employer Member Only areas. Links contained on this page may include:

Change Company Information

Search Resume Databank

Auto-search or "intelligent agent"

Report a Hire

Send e-mail to DCVS

Request a NetRep

Figure 7A:
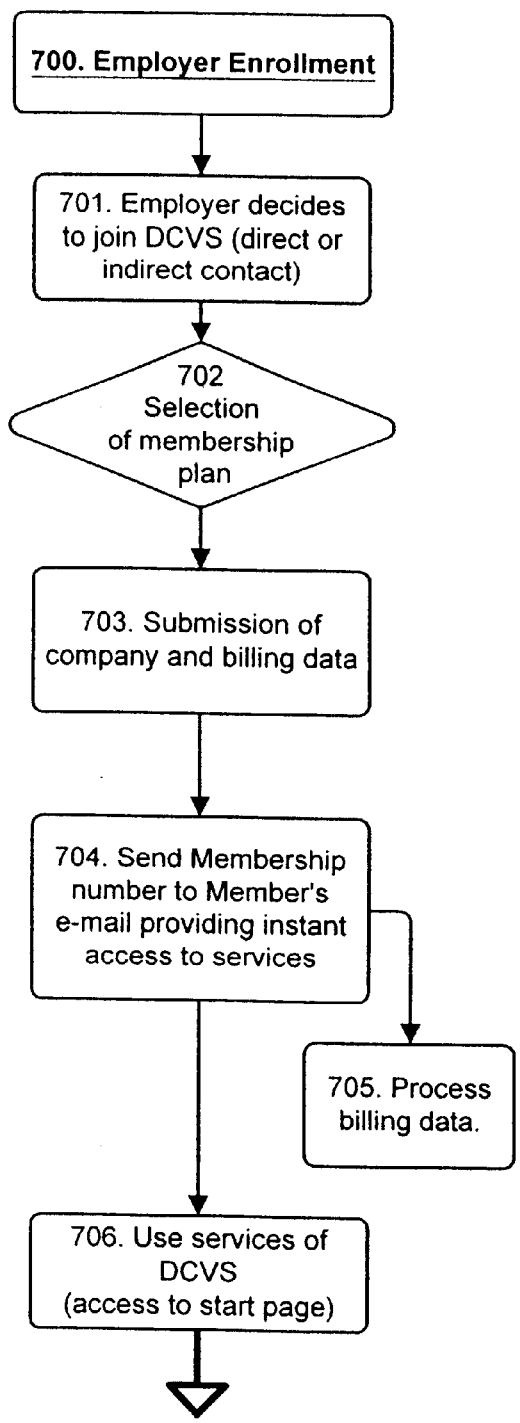
FIGS. 7A and B are flowcharts showing the Employer Member enrollment and company information change processes, respectively, of the preferred DCVP.

Employer Member Enrollment 700. The Member enrollment process is shown in the flowchart of FIG. 7A. The initial website contact (step 701) may be either direct, such as by opening the DCVS homepage through the browser file menu or search engine results, or may be indirect, such as by clicking a referral link in a third-party Marketing Partner's website.

The Employer may select the enrollment process from the Home Page, and is presented with a membership plan page (step 702). As with the Job Seeker enrollment, through the whole process of enrolling, the Employer preferably is given a time estimate for how long the entire enrollment process will take, and the Employer has the ability to bookmark the page to save intermediate information on forms. Preferably, the Employer may choose from a range of alternative levels of membership, suitable to differing levels and frequency of need of different employers. Each level of membership preferably includes an annual fee, a number of free certified resume inspections, a price for additional resume inspections and a contingency commission percentage to be based upon the first year's pay of the employee hired. The following Table A shows examples of alternative membership offers:

TABLE A

| Membership Type | Annual Fee Amount | # of Free Resumes | Price/addt'l Resume | Commission Percentage |
|---|---|---|---|---|
| Regular | $50 | 0 | $5 | 10% |
| Silver | $250 | 35 | $4 | 9% |
| Gold | $500 | 75 | $3 | 7% |
| Platinum | $2,000 | 400 | $2 | 5% |
| Diamond | $5,000 | unlimited | Free | 0% |

The Employer may select the chosen membership plan by checking boxes on the membership plan page.

After submitting membership plan choice, the Employer Member preferably is presented and completes a company information page (step 703) including template form entry of company information which may include contact person, address, phone numbers, e-mail address, and billing information. The Employer also selects a password, and provides credit/debit card or other payment information.

Optionally, Employer Member use of the Members-only features can be immediate, without waiting for payment confirmation (a major convenience and selling point). The membership account number may be sent by e-mail (step 704). The risk of allowing such immediate use, even without credit/debit card authorization, may be offset by the user-friendly nature and convenience to the Employer Member. The payment may then be processed off-line (step 705) as with Job Seeker enrollment.

Following member account creation (step 706), future logons will require membership number and password. As with Job Seeker enrollment, the Employer Member login presents an Employer Member Start Page.

Figure 7B:
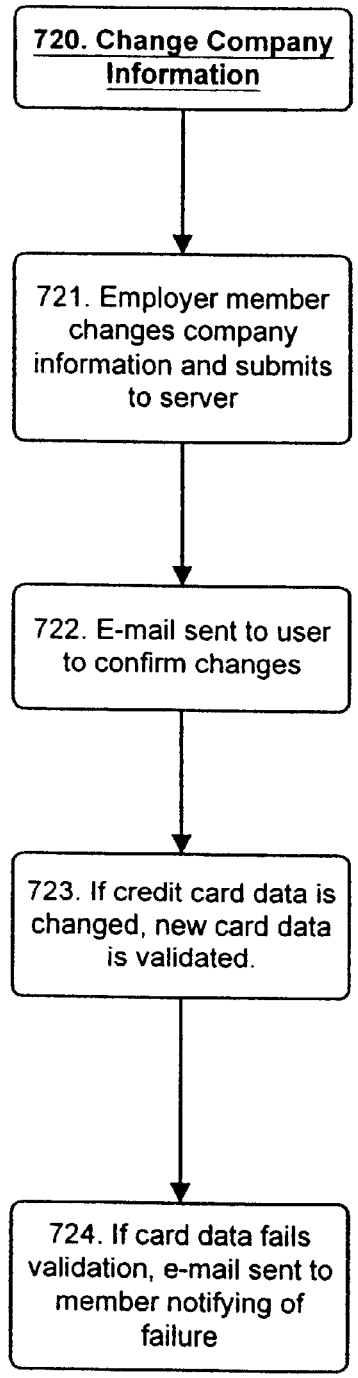

Changing Company Information 720. The preferred DCVS provides that, should the Employer Member need to change company information data, the Member may click on a link "Company Info", once logged into the Members-Only area, to allow them to change this information as depicted in FIG. 7B. The link selection displays a Company information edit page 721. Certain data items will preferably need to be confirmed once they are changed.

These are:

E-mail Address

Credit/debit Card number

Credit/debit Card expiration date

Other means of payment

After any changes are made, a confirming e-mail is sent (step 722), preferably to both the former and the new (if changed) e-mail address. The purpose of sending a message to a former e-mail address is to increase security by permitting a Member to detect any unauthorized account data changes. If a credit/debit card number was changed, it is verified (step 723) that it is a valid card that DCVS can use for any future billings for that client. If the card fails this validation, a message informing the Member is sent (step 724) to both their e-mail address and the Member Start Page.

The exemplary database structure of the preferred DVCS for Employer Member specific data is shown in Table 13 of the Appendix. This table contains data that is specific to an Employer Member.

Searching Resumes 800. As part of their membership, Employer Members are able to search the database of resumes that DCVS maintains. As shown in FIG. 8A, by clicking on "Search Resume Databank" on the Employer Start Page, the user is brought to a search criteria page (step 801) that allows them to enter into the database criteria for one or more options. The search criteria selected is preferably only run against resumes that have been chosen to be shown by the Job Seeker owners of the resume. The search criteria preferably including the following.

Desired salary

Geographic location

Industry

Level of education

Position

Willing to re-locate

Consultant, full-time, part-time

The above options may be chosen from an assortment of text boxes, checkboxes, option groups, and list boxes as appropriate. In addition to these options, the user may type in keywords to do a keyword search on the entire resume.

In the preferred embodiment of the invention, after the options are chosen, clicking Submit returns a search results page (step 802) listing any results of the query. On this results page is a column for each of the criteria fields, with the results listed below. The results will initially list about 25 records per page. The user has the option of choosing from a dropdown listbox to display records on subsequent pages in sets of about 10, 25, 50, or 100. At the top and bottom of each page is an index allowing them to jump between different pages of results as well as appropriate links for "Next" and "Previous" pages.

Clicking on one of the resume links in the row will call up that specific resume (step 803). The Member may also download or print the displayed resume using conventional browsers.

For each resume that is viewed, a record is created (step 804) in a database table containing the following information:

ID of Employer Member
ID of Employee Member the resume belongs to
Date/Time of viewing This data is used to send follow-up notices to Employer Members to see if they have made any hires from the resume data that they viewed. The viewing display of the resume and printing/download options are as described above with respect to Employer Visitors.

Automatic or Intelligent Agent Searching 820. As shown in FIG. 8B, in the preferred embodiment, by clicking on the link "Intelligent Agent" on the Employer start page, the user is brought to a search selection page (step 821) where they can activate/deactivate an automatic search feature (Intelligent Agent) as well as select the search criteria to be used. The preferred search selection page includes an option group including two buttons, "Yes" and "No" that set whether the Member has Intelligent Agent searching enabled. Below may be the appropriate fields for the user to enter their searching criteria. The search criteria may be the same used as when doing a manual search through the "Search Resume Databank" link described above. Once the user has made their selections, clicking a Submit button sends the information to the server where this data is stored in their account profile. The user is then returned to their start page.

The Intelligent Agent is a feature that each time a new resume is posted to the DCVS data bank (i.e., database resume record is flagged as "certified" following verification process), the server software processes the new resume with respect to all active Intelligent Agent profiles (step 822).

If the resume matches Agent search criteria for any Employer Member, each such Member is notified, preferably by an automatically generated e-mail notice, and/or a notice in queue for display on that Member's start page at next login. The notice preferably contains a hyperlink 823 to the resume viewing page to link to that new resume.

As noted above, the exemplary database structure of the preferred DVCS for resume viewing history data is shown in Table 4 of the Appendix.

Employer Reporting a Hire 840. When an Employer Member hires someone from the DCVS database, per their contract, they may be required to pay a fee to DCVS. As shown in FIG. 8D, in the preferred DCVP embodiment, the Member may click on a link "Report New Hire" from the Employer Start Page. This brings them to a reporting page (step 841) where they enter in the ID of the Job Seeker that was listed on the resume and also the annual salary of the employee.

Pressing a submit button brings up a commission confirmation page (step 842) listing the Job Seeker's name and the commission amount, if any, the Employer will be charged. If the ID entered by the user on the previous page does not relate to a current user in the database the Employer is returned to that page, informing them that the person could not be found and for them to enter a new ID.

After the correct Job Seeker is identified, the Member clicks an acceptance button, and is presented a payment confirmation page (step 843) where method of payment and charge authorization is submitted.

Billing Follow Up. In the preferred embodiment, routine follow-up notices are sent to active members who have viewed certified resumes. For example, each week, following an about four-week delay from the first viewing of a resume, an employer may be sent a list of all of the resumes viewed by them to query as to whether or not any of them have been hired.

The follow-up step may be performed automatically by the DCVS database processing system based on the viewing log database record. To do this, an e-mail may be generated and sent to the Employer Member asking if they have hired any employees from the DCVS databank (database). The message may include a list of individuals whose resumes were viewed and what date and time they were viewed.

The Member may respond by clicking a link within the e-mail message which opens a DCVS webpage into their browser containing the list of individuals and the date/time the resume was last viewed by them. Next to each persons name is a checkbox that when checked off indicates a hire (these preferably are left unchecked by default) as well as a text box that allows the user to enter in the annual salary of the new employee. Clicking submit on the bottom of the page sends the checked off items to a database file to allow for the Employer to be billed per their Membership Agreement with DCVS.

Employer Visitor Specific Functionality

As described above with respect to FIG. 6B, when a DCVS Job Seeker Member wants to let a potential employer or other person (collectively "Visitor") view their certified resume on-line, the Visitor is given the Member's secondary Login ID and password.

Visitor certified resume Lookup 860. As shown in FIG. 8D, in the preferred DCVP, the Visitor may now open the DCVS website home page, and click a button "Visitor Login", from which the Visitor is presented with the resume lookup page (step 861). This page preferably utilizes frames with a thin frame on top and the remaining bottom of the screen containing the second frame. To view a resume, the Visitor enters the Login ID and Password provided by the Member in the top frame in provided fields. The Visitor is then preferably asked to fill out a on-line form giving name of Visitor, Company, address, e-mail address, and the like. Optionally, the visitor may by offered a list of available services the DCVS has to offer employers. If requested, a dropdown menu can direct the Visitor to the list and provides options, and links, for further use.

After login, the Visitor may click a Lookup button in the top frame to send a request to the DCVS database to look up the Resume matching the Login ID and password (step 862). If a resume is found and the Member has currently enabled it to be shown, the certified resume appears in the bottom frame. If the Resume is not found or the Member opted not to display it, an appropriate message is shown to the visitor in the bottom frame.

When a Member's certified resume is displayed to a Visitor, a record is created in the DCVS database (step 863) that logs the Visitor's name, Date, Time, and the Member ID of the person whose Resume was viewed. The preferred data structure for this log is described at Table 4. The viewer is able to print or download the resume through their conventional browser software. Preferably, each data item that is certified has a small certified resume logo along side it, highlighting or other identifier that indicates certification.

Marketing Partner Specific Functionality

1. Referral Partners. DCVS may enter into marketing arrangements with other web sites to refer potential Job Seeker and/or Employer Members to the DCVS website (incoming referrals). These co-marketing arrangements may be substantial strategic partnerships with commercial websites with strongly aligned business interests. The arrangements may also be more limited agreements with "billboard" type websites whose topical nature indicates that their audiences may include potential Members, and whose webmasters are seeking advertising revenue to offset costs. The specifics of the marketing agreements may reflect the degree of participation and business interests. Typically, the partnership webpages will include banner-type messages and hyperlinks to the DCVS website, which an interested potential DCVS Member may use to navigate to the DCVS site.

The exemplary database structure of the preferred DVCS for referral partner specific data is shown in Table 5 of the Appendix. This table contains a list of companies who have placed a DCVS link on their site or referred a person to the DVCS via other means.

2. Referral Commissions. If a new Membership was the result of an on-line referral from a marketing partner or other third-party in accordance with the commission agreement, this partner or third-party may be entitled to receive a commission.

If the user was referred to DCVS via a Internet Website marketing partner, a state variable will preferably contain the partner's unique ID that was obtained from the referring URL. Upon the user submitting their personal information, the server checks this variable for a valid ID and, if found, records it in the referral tracking table.

After the user enters Resume Data and it passes any validation rules for this process, the user will start the Personal Data Submission Process.

3. Automated Referral Logging And Tracking. In the preferred embodiment, each marketing partner is assigned a unique ID code. Any referral link to the DCVS that they maintain on their site may contain this code as a suffix. This suffix code may then used by the DCVS to identify and log the referring partner for each Job Seeker contact to the DCVS site which is routed by such a referral link. To monitor the efficiency of DCVS marketing partnerships, referrals to and from these partners are preferably recorded in a database. preferably, when a DCVS page is accessed from a DCVS marketing partner, the partners ID code is stripped off the end of the redirecting URL and stored in a referral database that also contains the current date, time, and referring URL for this page access. The referral partnership agreement may provide that commissions be based on the total volume of referrals from the partner's site, which can be calculated automatically by the DCVS system from the referral database.

The exemplary database structure of the preferred DVCS for referral tracking data is shown in Table 6 of the Appendix. This table includes data used to log when a referral was performed to the DCVS site from either another site or other means such as a software package insert.

4. Results-Based Commissions. Alternatively or additionally, the commission may be results-based. For, example, in the preferred embodiment, a commission may be payable if the referral results in a new Membership in DCVS. This may apply to either a Job Seeker or Employer Member. To do this, preferably the referring ID is maintained in state as a cookie or other means during in the Member enrollment process. By tracking the cookie or other status means, the referral database may then be updated to include the enrollment status corresponding to a specific referral.

Optionally, the referral database may be further updated to reflect subsequent hiring data corresponding to a particular referral resulting in membership (again, optional the hiring results may be track for either a Job Seeker or Employer Member). For example, a particular strategic partner may have the capability to direct pre-screened, actively-recruited or incentive-motivated (e.g., by discount offers and the like) potential Members to the DCVS site. In such strategic partnership arrangements, it may be advantageous for the referral commissions or other consideration to be based on the actual revenue to the DCVS generated by a particular referred Member. Such an option is permitted and facilitated by described results-based referral tracking process.

Thus, the preferred referral logging and tracking process described above permits a high degree of flexibility in the nature of referral and marketing partnership agreements. It also permits the partnership agreements to be executed with a high degree of automation, accuracy and accountability by the DCVS system so as to maximize the membership volume with minimal DCVS labor and accounting costs.

5. DCVS links to partner's sites or other resources. DCVS may optionally also refer DCVS visitors to other sites by links in the DCVS webpages (outgoing referrals). These sites may include other resources useful to Job Seekers or Employer Members. The sites may also include sites with whom the DCVS has a referral agreement, for example sites which cooperatively cross-refer customers or which pay referral commissions to the DCVS. In the preferred DCVP, this is done by use of a redirecting URL. When the DCVS site visitor clicks an URL that references a remote destination, a process on the DCVS server grabs the ID referenced in the URL and enters a record into a DCVS database detailing the date, time, and the ID that Identifies the partner. Using the ID, the destinations URL is located in a DCVS database that then is used to redirect the users browser to that page. As with the automated referral logging and tracking described above with respect incoming referrals, the DCVS system can log the outgoing referrals. Similarly, a strategic partner employing an embodiment of the DCVS system or other system including automated referral logging and tracking may track the outgoing referrals on a results basis.

The exemplary database structure of the preferred DVCS for Resource data is shown in Table 8 of the Appendix. This table contains a list of other career resources on the web that DCVS lists within it's pages. The exemplary database structure for resource referral tracking data is shown in Table 9 of the Appendix. This table includes data used to track and log when a person accessing the DCVS site clicks on a hyperlink to navigate to a career resource listed on DCVS.

Non-Routine Functionality

The preferred DCVP of the invention may include non-routine functionality common to one or more types of DCVS contacts to address particular situations, as shown in the following examples:

1. Membership Maintenance. When a Job Seeker or Employer Member has a credit/debit card on file with DCVS, 30 days prior to the month that the card or Membership Plan expires, the Member is preferably sent an e-mail message notifying them of the upcoming expiration. The e-mail,message preferably contains the Members credit/debit card number with the last 4 numbers masked out as well as the expiration date. The message contains links to pages on the DCVS web site that detail their different billing options and instructions on how to update their billing and/or account information. If the account is set for auto-renew and the credit/debit card registered with DCVS is still valid, an e-mail message is preferably sent to the user notifying them that their credit/debit card has been debited in the amount of the renewal fee.

2. Cancel Account. A Member may cancel DCVS Membership on-line. From within the Members-Only section, clicking on an appropriate link brings them to the cancellation page. After displaying text giving reasons why they should not cancel, the Member keys in their Login ID, Password, and Security Word to verify their identity. Clicking on a button labeled "Cancel Membership" sends the page to the DCVS server. Another "Cancel" verification request is required and then the Membership is cancelled. When the Membership is cancelled, DCVS deletes any resume data associated with the user from its records, but retains any personal data such as Name, Address, etc. This personal data is retained to allow the account to be re-opened if desired by a former Member. At this point an e-mail is sent to the former Member's registered e-mail account with notice of the cancellation. After the cancellation is processed, the Member is logged out and returned to the DCVS main page. Any attempt by them to log in, or for a Visitor to view their Resume on-line, fails.

3. Password Recovery. If a Member is not able to remember the password, they can retrieve it from DCVS's web site. The option for password recovery is available on the Login page. If a Member chooses to recover their password, they are presented with a page where they enter in their Login ID and their Security Word which can be any word chosen by the Member. Upon clicking submit, the page is sent to the server where the account is looked up using the provided information. If a match is found, an e-mail is sent to the e-mail address listed in their profile containing the password. If a match is not found, a page is returned allowing the user to re-enter the data and resubmit. If the Member does not remember either their Login ID or Security Word, they need to contact DCVS's Customer Service phone line. At the DCVS Operations Center, Customer Service personnel are able to call up all Member personal information in order to retrieve lost passwords or change any personal information as needed. This data is accessed through a secure connection through a browser interface.

Industrial Applicability

It is evident that the data certification and verification system of the invention including a multiple user controlled interface has wide industrial applicability to the employee recruitment field and other uses.

There is a broad range of useful applications of the system of the invention in addition to the embodiments described above. In particular, this system may be used for data certification, access control and management where multiple parties need to use and independently exercise control over a database, especially by means of Internet communication.

Examples of such use are expert consultant databank systems, multiple-listing services, medical or dental referral systems, and the like. The industrial fields so served may include a dating agency, a small business resources agency, a child care referral agency, and an in-home services agency. The data escrow functionality of the DVCP is particularly advantageous in multiple-party business transactions.

In addition, the system has clear capability and usefulness when employed as a data authentication system in scientific studies subject to regulatory agency controls, such as FDA clinical trials. For example, system may provide for "double-blind" data controls and tailored access powers for different parties, such as contributing clinicians, proprietary applicants, and regulatory oversight staff.

Other examples of the application of the invention include the collection and verification of data by government agencies for security clearances, and the management and verification of sensitive proprietary information in corporate events regulated by the SEC.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

TABLE 1

JOB SEEKER MEMBER DATA
Description: This table contains all data that is specific to a Member with the exception of the resume data.

| Field Name | Data Type | Length | Primary Key | Index | Allow Duplicates | Required | validation Rule | Description |
|---|---|---|---|---|---|---|---|---|
| Member ID | Numeric | Long | Yes | Yes | No | Yes | Auto-Increment | System generated numeric ID. |
| FirstName | Text | 25 | | | Yes | Yes | | Member First Name |
| MiddleInitial | Text | 1 | | | Yes | No | | Middle Initial |
| LastName | Text | 30 | | | Yes | Yes | | Last Name |
| StreetAddress1 | Text | 60 | | | Yes | Yes | | Street 1 |
| StreetAddress2 | Text | 60 | | | Yes | No | | Street 2 |
| City | Text | 20 | | | Yes | Yes | | City |
| StateProvince | Text | 20 | | | Yes | Yes | | State or Province |
| PostalCode | Text | 15 | | | Yes | Yes | | Zip Code/Postal Code |
| Country | Text | 20 | | | Yes | Yes | | Country |
| SocialSecurity | Text | 11 | | | Yes | No | | If US Citizen, SS# |
| DriversLicenseState | Text | 20 | | | Yes | No | | Driver license state |
| DriversLicenseNumber | Text | 20 | | | Yes | No | | Drivers license number |
| DateOfBirth | Date | Date | | | Yes | Yes | MM/DD/YY | Date of Members birth |
| PlaceOfBirthCity | Text | 20 | | | Yes | Yes | | City member born in |
| PlaceOfBirth-State | Text | 20 | | | Yes | Yes | | State/Province member born in |
| PlaceOfBirth-Country | Text | 20 | | | Yes | Yes | | Country member born in |
| EmailAddress | Text | 50 | | | Yes | Yes | | E-mail Address |
| PhoneNumber | Text | 15 | | | Yes | No | | Phone Number |
| MilitaryService | Boolean | | | | Yes | Yes | | |

TABLE 1-continued

JOB SEEKER MEMBER DATA
Description: This table contains all data that is specific to a Member with the exception of the resume data.

| Field Name | Data Type | Length | Primary Key | Index | Allow Duplicates | Required | validation Rule | Description |
|---|---|---|---|---|---|---|---|---|
| ServiceStart | Date | Date | | | Yes | No | MM/YY | If Service=Yes, start of service |
| ServiceEnd | Date | Date | | | Yes | No | MM/YY | If Service=Yes, end of service |
| ServiceBranch | Text | 50 | | | Yes | No | | If Service=Yes, branch of service |
| DischargeType | Text | 25 | | | Yes | No | | If Service=Yes, type of discharge |
| LoginID | Text | 15 | | Yes | No | Yes | Minimum 5 characters | User created ID. No duplicates allowed. |
| Password | Text | 15 | | Yes | Yes | Yes | Minimum 5 characters | User created Password used for Login |
| Security Word | Text | 20 | | | Yes | Yes | | Special word or mothers maiden name needed to verify user. |
| ActiveMemberPlan | Numeric | Integer | | | Yes | Yes | | Numeric code linked to plan table |
| AutoRenew | Boolean | | | | Yes | yes | | Automatically Renew Membership after expiration? |
| PlanStartDate | Date | Date | | | Yes | No | MM/DD/YY | Start date of current plan, if any |
| PlanEndDate | Date | Date | | | Yes | No | MM/DD/YY | End date of current plan, if any |
| CreditCardType | Numeric | Byte | | | Yes | Yes | | Members credit/debit card for billing |
| CCNumber | Text | 20 | | | Yes | Yes | | Billed Credit/debit Card Number |
| ExpirationDate | Date | Date | | | Yes | Yes | MM/YY | Credit/debit Card Expiration Date |
| ResumeStatus | Numeric | Byte | | | Yes | Yes | | Status of resume.(Code Listings) |
| LastLogonDate | Date | | | | Yes | No | MM/DD/YY | Date of last user logon |
| LastLogonTime | Time | | | | yes | no | HH:MM | Time of last user logon |

TABLE 2

SECONDARY PASSWORDS
Description: This table stores the secondary password sets for all Members

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| MemberID | Numeric | Long | Yes | Yes | No | Yes | Auto-Increment | Member ID linking back to Member table. |
| ResumeLogin | Text | 15 | | | Yes | Yes | | Login ID for Employers to view resume online |
| ResumePassword | Text | 15 | | | Yes | Yes | | Password for Employers to view resume online |
| Description | Text | 35 | | | Yes | | | User defined subscription. |

TABLE 3

RESUME ITEMS
Description: This table contains the resume data to be certified. It is linked to the Member table on a 1-to-many basis by the Member ID. Each resume item is stored in it's own record. Data is stored stating who certified the item, when it was certified, and any notes entered by the verification specialist.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| MemberID | Numeric | Long | Yes | Yes | No | Yes | Auto-Increment | Member ID linking back to Member table. |
| InfoType | Numeric | Long | | Yes | Yes | yes | | See Code Listings |
| StartDate | Date | | | | Yes | Yes | MM/YY | Item Start Date |
| EndDate | Date | | | | Yes | No | MM/YY | Item End Date |
| Description | Text | | | | Yes | Yes | | Item Description |
| ContactPhone | Numeric | | | | Yes | | | Phone number of person able to verify fact |
| ContactName | Text | | | | Yes | | | Name of person able to verify fact |
| CertificationStatus | Numeric | Integer | | Yes | Yes | Yes | | See Code Listings |
| Certified | Boolean | | | | Yes | Yes | | Whether item passed certification |
| CertifiedDate | Date | | | | Yes | | MM/YY | Date Certified |
| CertifiedTime | Time | | | | Yes | | HH:MM (24 hour) | Time certified |

TABLE 3-continued

RESUME ITEMS

Description: This table contains the resume data to be certified. It is linked to the Member table on a 1-to-many basis by the Member ID. Each resume item is stored in it's own record. Data is stored stating who certified the item, when it was certified, and any notes entered by the verification specialist.

| Field Name | Data Type | Length | Primary Key | Index | Allow Duplicates | Required | Validation Rule | Description |
|---|---|---|---|---|---|---|---|---|
| CertifiedByCompany | Numeric | Long | | Yes | Yes | | | Code linked to third-party table |
| CertifiedByPerson | Numeric | Long | | Yes | Yes | | | Code linked back to third-party employee table |
| CertificationNote | Text | Memo | | | Yes | | | Note entered in by VS |

TABLE 4

RESUME VIEW HISTORY

Description: This table contains a history of when resumes are viewed on line, so that a Member to be able to tell when and how many times their online resume has been viewed.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| MemberID | Numeric | Long | | Yes | Yes | Yes | | Member ID of resume viewed |
| IDSet | Numeric | Long | | | Yes | Yes | | Link to Secondary Password sets |
| ViewDate | Date | | | | Yes | Yes | | Date viewed |
| ViewTime | Time | | | | Yes | Yes | | Time viewed |
| CompanyName | Text | 50 | | | Yes | | | Supplied by viewer |
| EmailAddress | Text | 60 | | | Yes | | | Supplied by viewer |
| Address | Text | Memo | | | Yes | | | Supplied by viewer |

TABLE 5

REFERRAL PARTNERS

Description: This table contains a list of companies who have placed a DCVS link on their site or referred a person to us via any other means.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| CompanyName | Text | 60 | | | Yes | Yes | | Company name |
| StreetAddress1 | Text | 60 | | | Yes | Yes | | Street Address 1 |
| StreetAddress2 | Text | 60 | | | Yes | No | | Street address 2 |
| City | Text | 20 | | | Yes | Yes | | City |
| StateProvince | Text | 15 | | | Yes | Yes | | State or province |
| PostalCode | Text | 15 | | | Yes | Yes | | Zip or postal code |
| Country | Text | 20 | | | Yes | Yes | | Country |
| WebSiteUrl | Text | 250 | | | Yes | Yes | | Partners Url |
| ContactName | Text | 60 | | | Yes | Yes | | Partner contact name |
| ContactPhoneNumber | Text | 15 | | | Yes | Yes | | Partner phone number |
| Active | Boolean | | | | Yes | Yes | | Active partner (Y/N) |
| Commission | Numeric | Percent | | | Yes | yes | | Partner commission percentage |

TABLE 6

REFERRALS TRACKING

Description: This table logs when a referral was performed to the DCVS site from either another site or other means such as software package insert.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| PartnerID | Numeric | Long | | Yes | Yes | Yes | | Referral Partner ID |
| ReferralType | Numeric | Long | | Yes | Yes | Yes | | See Code Listing |
| ReferralUrl | Text | Memo | | | Yes | No | | URL user navigated from |
| ReferDate | Date | Date | | | Yes | Yes | MM/DD/YY | Date of Referral |

TABLE 6-continued

REFERRALS TRACKING
Description: This table logs when a referral was performed to the DCVS site from either another site or other means such as software package insert.

| Field Name | Data Type | Length | Primary Key | Index | Allow Duplicates | Required | Validation Rule | Description |
|---|---|---|---|---|---|---|---|---|
| ReferTime | Time | Time | | | Yes | yes | HH:MM | Time of Referral |
| MemberIDReferred | Numeric | Long | | Yes | yes | | | If referral resulted in successful DCVS Membership, ID of the new Member |

TABLE 7

MEMBERSHIP PLANS
Description: This table contains fields that define any Membership plans that are offered by DCVS.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| Name | Text | 25 | | | | Yes | | Name of plan |
| Description | Text | 250 | | | | Yes | | Description of plan |
| LengthMonths | Numeric | Integer | | | | Yes | | Length of plan. 0=lifetime |
| StartDate | Date | | | | | Yes | | Date plan is available |
| ExpireDate | Date | | | | | Yes | | Date plan offer expires |
| BaseRate | Currency | | | | | Yes | | Cost of base plan |
| NumEduItems | Numeric | Byte | | | | Yes | | Number of educational items included |
| ExtraEduItemsCost | Currency | | | | | Yes | | Cost of additional educational items |
| NumEmpItems | Numeric | Byte | | | | Yes | | Number of employment items included |
| ExtraEmpItemsCost | Currency | | | | | Yes | | Cost of additional employment items |
| NumAwardItems | Numeric | Byte | | | | Yes | | Number of award items included |
| ExtraAwardItemsCost | Currency | | | | | Yes | | Cost of additional award items |
| NumCertItems | Numeric | Byte | | | | Yes | | Number of certifications items included |
| ExtraCertItemsCost | Currency | | | | | Yes | | Cost of additional certification items |
| AutoRenewable | Boolean | | | | | Yes | | Can Member let this plan AutoRenew? |

TABLE 8

RESOURCE LISTINGS
Description: This table contains a list of other career resources on the web that DCVS lists within it's pages.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| Type | Numeric | Byte | | | Yes | Yes | | Category resource falls under. See code list below |
| Caption | Text | 250 | | | Yes | Yes | | Caption to be used for resource on page |
| Description | Text | Memo | | | Yes | Yes | | Description to be used, for resource on page |
| Sitter | Text | 100 | | | Yes | Yes | | URL resource should link to |
| Preferred | Boolean | | | | Yes | yes | | Preferred partner (Y/N) |
| Active | Boolean | | | | Yes | Yes | | Active Resource (Y/N) |

TABLE 9

RESOURCE REFERRALS
Description: This table tracks when a person on the DCVS site clicks on a hyperlink to navigate to a career resource listed on DCVS.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| ResourceID | Numeric | Long | | Yes | Yes | Yes | | ID of resource referred |
| ReferDate | Date | | | | Yes | Yes | | Date referred |
| ReferTime | date | | | | Yes | yes | | Time Referred |

TABLE 10

VERIFICATION SERVICES
Description: This table contains information identifying the third-party verification specialists that DCVS uses.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| CompanyName | Text | 60 | | | Yes | Yes | | Company name |
| StreetAddress1 | Text | 60 | | | Yes | Yes | | Street Address 1 |
| StreetAddress2 | Text | 60 | | | Yes | No | | Street address 2 |
| City | Text | 20 | | | Yes | Yes | | City |
| StateProvince | Text | 15 | | | Yes | Yes | | State or province |
| PostalCode | Text | 15 | | | Yes | Yes | | Zip or postal code |
| Country | Text | 20 | | | Yes | Yes | | Country |
| WebSiteUrl | Text | 250 | | | Yes | Yes | | Partners URL |
| ContactName | Text | 60 | | | Yes | Yes | | Contact Name |
| ContactPhoneNumber | Text | 15 | | | Yes | Yes | | Contact phone number |
| Active | Boolean | | | | Yes | Yes | | Active partner |
| AdminLogin | Text | 15 | | | No | Yes | | DCVS generated Administrator Login |
| AdminPassword | Text | 15 | | | Yes | Yes | | DCVS generated Administrator password |

TABLE 11

VERIFICATION SERVICE PERSONELL
Description: This table maintains a list of the employees or staff of the third-party VS who have access to certify items. This table is required to log a VS's activity within the DCVS system.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| CompanyID | Numeric | | | Yes | Yes | Yes | | ID to link back to company table. |
| Name | Text | 60 | | | Yes | Yes | | Employee Name |
| LoginID | Text | 15 | | | No | Yes | | Employee DCVS generated login ID |
| Password | Text | 15 | | | Yes | Yes | | Employee DCVS generated password |
| Active | Boolean | | | | yes | Yes | | Active employee (Y/N) |

TABLE 12

VERIFICATION SERVICE ACTIVITY LOG
Description: This table logs all database actions performed by a VS. Such as logging in/out, requesting a resume, updating data, etc . . .

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System generated numeric ID. |
| CompanyID | Numeric | Long | | Yes | Yes | Yes | | Company ID action performed by |
| EmployeeID | Numeric | Long | | Yes | Yes | Yes | | Employee ID action performed by |
| ActionDate | Date | | | | Yes | Yes | | Date action performed |
| ActionTime | Time | | | | Yes | Yes | | Time action performed |
| ActionPerformed | Numeric | Byte | | | Yes | Yes | | Code of action performed. See Code List below. |

TABLE 12-continued

VERIFICATION SERVICE ACTIVITY LOG
Description: This table logs all database actions performed by a VS. Such as logging in/out, requesting a resume, updating data, etc . . .

| Field Name | Data Type | Length | Primary Key | Index | Allow Duplicates | Required | Validation Rule | Description |
|---|---|---|---|---|---|---|---|---|
| MemberID | Numeric | Long | | Yes | Yes | No | | ID of Member action performed on if applicable |
| MemberItem | Numeric | Long | | | yes | No | | Member resume item ID action performed on if applicable |

TABLE 13

EMPLOYER MEMBER DATA
Description: This table contains all data that is specific to an Employer Member

| Field Name | Data Type | Length | Primary Key | Index | Allow Dup. | Required | Validation Rule | Description |
|---|---|---|---|---|---|---|---|---|
| EmployerID | Numeric | Long | Yes | Yes | No | Yes | Auto-Increment | System generated numeric ID. |
| CompanyName | Text | 60 | | | Yes | Yes | | Company name |
| StreetAddress1 | Text | 60 | | | Yes | Yes | | Street Address 1 |
| StreetAddress2 | Text | 60 | | | Yes | No | | Street address 2 |
| City | Text | 20 | | | Yes | Yes | | City |
| StateProvince | Text | 15 | | | Yes | Yes | | State or province |
| PostalCode | Text | 15 | | | Yes | Yes | | Zip or postal code |
| Country | Text | 20 | | | Yes | Yes | | Country |
| WebSiteUrl | Text | 250 | | | Yes | Yes | | Partners URL |
| ContactName | Text | 60 | | | Yes | Yes | | Contact name |
| ContactPhoneNumber | Text | 15 | | | Yes | Yes | | Contact phone number |
| EmailAddress | Text | 50 | | | Yes | Yes | | E-mail Address |
| Active | Boolean | | | | Yes | Yes | | Active partner |
| LoginID | Text | 15 | | Yes | No | Yes | Min 5 char | User created ID. No duplicates allowed. |
| Password | Text | 15 | | Yes | Yes | Yes | Min 5 char | User created Password used for Login |
| Security Word | Text | 20 | | | Yes | Yes | | Special word needed to verify user. |
| ActiveMemberPlan | Numeric | Integer | | | Yes | Yes | | Numeric code linked to plan table |
| AutoRenew | Boolean | | | | Yes | yes | | Automatically Renew Membership? |
| PlanStartDate | Date | Date | | | Yes | No | MM/DD/YY | Start date of current plan, if any |
| PlanEndDate | Date | Date | | | Yes | No | MM/DD/YY | End date of current plan, if any |
| LastLogonDate | Date | | | | Yes | No | MM/DD/YY | Date of last user logon |
| LastLogonTime | Time | | | | yes | no | HH:MM | Time of last user logon |

TABLE 14A

CODE TABLE STRUCTURE
Code Listings: Code listings are used by certain tables when a field within the table can hold different types of data, all referenced by a code.

| Field Name | Data Type | Length | Primary Key | Index | Allow Duplicates | Required | Validation Rule | Description |
|---|---|---|---|---|---|---|---|---|
| ID | Numeric | Long | Yes | Yes | No | Yes | Auto-Increment | System Generated Numeric ID |
| Code | Numeric | Integer | No | Yes | No | Yes | | Code identifying Item |
| Description | Text | 200 | No | No | Yes | Yes | | Text identifying Item |

TABLE 14B

ResumeStatus
Used In: Membership table

| Code | Description |
|---|---|
| 0 | No Resume on File |
| 1 | Resume has been certified |
| 2 | Resume in certification Process |
| 3 | Resume needs certification |

TABLE 14C

CertificationStatus
Used In: ResumeItems

| Code | Description |
|---|---|
| 0 | No Action Required |
| 1 | Certification Needed |
| 2 | Could Not Certify |

TABLE 14D

InfoType
Used In: ResumeItems

| Code | Description |
|---|---|
| 1 | Education |
| 2 | Employment |
| 3 | Awards |
| 4 | Certifications |

TABLE 14E

ReferralType
Used In: Referrals

| Code | Description |
|---|---|
| 1 | URL Navigation |
| 2 | Sign Up Page |

TABLE 14F

ActionPerformed
Used In: Third Party Activity Log

| Code | Description |
|---|---|
| 1 | User Login |
| 2 | User Logout |
| 3 | Data Requested |
| 4 | Data Updated |

TABLE 14G

ResourceType
Used In: Resource Listings

| Code | Description |
|---|---|
| 1 | Resource 1 |
| 2 | Resource 2 |
| 3 | Resource 3 |
| 4 | Resource 4 |
| 5 | Resource 5 |

What is claimed is:

1. A multiple-party data attribute management system for the controlled exchange of data, said system comprising:

a) a database interface device for accessibly storing said data, said data including at least one data item having at least one data item attribute that can be varied between at least one unverified attribute source state and at least one verified attribute use state to enhance the useful value of said data item, b) said database interface device is accessible for data exchange with:
  i) at least one data originator for submitting said data to said interface device with said at least one data item having said attribute in said unverified source state;
  ii) at least one attribute verifier for verifying the truth or falsity of said attribute, and for changing said attribute from said unverified source state to said verified use state;
  iii) at least one data user for using said data with said at least one data item having said attribute in said verified use state; and c) said interface device includes an access control system for controlling said access to said interface device by at least one of:
  i) said data originator for preventing alteration of said attribute;
  ii) said data originator for verifying the identity of said data user; and
  iii) said data user for verifying the identity of said data originator.

2. A multiple-party data attribute management system as in claim 1, wherein:

a) said database interface device includes at least one Internet website server computer system accessible via the Internet for at least a portion of said data exchange;

b) said server computer system includes computer software and hardware permitting said server system to do at least one of
  i) accessibly store said data; and
  ii) to maintain an Internet website for said data exchange with at least one of said originator, said verifier and said data user; and c) said server computer system software and hardware includes said access control system.

3. A multiple-party data attribute management system as in claim 2, wherein:

a) said database interface device is accessible for data exchange with at least one interface manager for controlling said data exchange between said originator, said verifier and said user;

b) said data interface device is controllable by said manager to do at least one of:
  i) permit said data originator to submit said data to said interface device with said attribute unverified;
  ii) permit said attribute verifier to change said data attribute;
  iii) permit said data user to access said data with said attribute verified;
  iv) to access said data to perform at least one quality control determination with respect to at least one of said data and said data item attribute.

4. A multiple-party data attribute management system as in claim 3, wherein:

said data interface device is controllable by said data originator for determining the access to said data by said data user.

5. A multiple-party data attribute management system as in claim 4, wherein:

said database interface device includes an access recorder for logging the access of said data user to said data, said access recorder log may be interrogated by said data originator.

6. A multiple-party data attribute management system as in claim 5, wherein:

a) said data originator is a job-seeker;

b) said data includes at least one fact pertaining to said job seeker; and c) said at least one data attribute includes information pertaining to the truth or falsity of said at least one fact;

d) said data originator submits said data with said truth or falsity of said fact undetermined;

e) said attribute verifier is a data verifier who determines said truth or falsity;

f) said determinations include one or more of:
  i) said truth or falsity of said fact is not yet determined;
  ii) said fact is determined to be true;

iii) said fact is determined to be false;
iv) said fact is determined to be partially true; and
v) said truth or falsity cannot be determined; and g) said data user includes a prospective employer of said job-seeker accessing said data with said attribute in said verified use state for use in at least one hiring decision.

7. A method of data attribute management for the controlled data exchange between multiple parties, comprising in any operative order the steps of:

a) accessibly storing said data, said data including at least one data item having at least one data item attribute that can be varied between at least one unverified attribute source state and at least one verified attribute use state to enhance the useful value of said data item, b) providing access for said data exchange with:
  i) at least one data originator for submitting said data with said at least one data item having said attribute in said unverified source state;
  ii) at least one attribute verifier for verifying the truth or falsity of said attribute, and for changing said attribute from said unverified source state to said verified use state;
  iii) at least one data user for using said data with said at least one data item having said attribute in said verified use state; and c) controlling said access by at least one of:
  i) said data originator for preventing alteration of said attribute by said originator;
  ii) said data user for preventing alteration of said attribute by said user;
  iii) said data originator for verifying the identity of said data user; and
  iv) said data user for verifying the identity of said data originator.

* * * * *